United States Patent
Milosevic et al.

(10) Patent No.: US 8,761,954 B2
(45) Date of Patent: Jun. 24, 2014

(54) DEVICES AND METHODS FOR DECENTRALIZED COORDINATED VOLT/VAR CONTROL

(75) Inventors: Borka Milosevic, Atlanta, GA (US); Willem Hendrik Du Toit, Cochrane (CA); Aleksandar Vukojevic, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 495 days.

(21) Appl. No.: 13/191,422

(22) Filed: Jul. 26, 2011

(65) Prior Publication Data

US 2013/0030599 A1    Jan. 31, 2013

(51) Int. Cl.
| | | |
|---|---|---|
| G05D 3/12 | (2006.01) | |
| G05D 5/00 | (2006.01) | |
| G05D 9/00 | (2006.01) | |
| G05D 11/00 | (2006.01) | |
| G05D 17/00 | (2006.01) | |
| G06G 7/54 | (2006.01) | |

(52) U.S. Cl.
USPC ........... 700/298; 700/286; 700/291; 700/295; 700/297; 703/18

(58) Field of Classification Search
CPC .............. H02J 3/12; H02J 13/00; H02J 3/16; H02J 3/1821; H02J 3/1878; H02J 13/0006; Y02E 60/273; Y04S 10/16; Y04S 10/22
USPC ...................... 700/286, 291, 295–298; 703/18
See application file for complete search history.

(56) References Cited

U.S. PATENT DOCUMENTS

| | | | |
|---|---|---|---|
| 3,754,184 | A | 8/1973 | Stone |
| 3,872,286 | A | 3/1975 | Putman |
| 4,234,843 | A | 11/1980 | Gyugyi et al. |
| 4,313,081 | A | 1/1982 | Smith |
| 4,413,189 | A | 11/1983 | Bottom, Jr. |
| 4,419,619 | A | 12/1983 | Jindrick et al. |
| 4,449,054 | A | 5/1984 | Jop |
| 4,630,220 | A | 12/1986 | Peckinpaugh |
| 4,677,364 | A | 6/1987 | Williams et al. |
| 4,695,737 | A | 9/1987 | Rabon et al. |

(Continued)

FOREIGN PATENT DOCUMENTS

| | | |
|---|---|---|
| EP | 1071185 | 1/2001 |
| WO | WO2008025162 | 3/2008 |

OTHER PUBLICATIONS

"Voltage Control in Power System Based on SCADA System" by Pimpa et al.; Power Engeerinbg Society Winter Meeting, 2002, IEEE vol. 2, pp. 1282-1286.*

(Continued)

*Primary Examiner* — Ramesh Patel
(74) *Attorney, Agent, or Firm* — Fletcher Yoder, P.C.

(57) ABSTRACT

Devices and methods for decentralized coordinated Volt/VAR control are provided. Such a device may allow, for example, an operational parameter such as voltage, power losses, a combination of these, and/or power factor to be optimized on a segment of an electrical distribution system under certain conditions. For example, a controller may include a network interface to receive measurements and data processing circuitry to optimize a voltage deviation, active power losses, or a combination thereof, based at least in part on the total load on the segment of the electrical distribution system.

20 Claims, 26 Drawing Sheets

(56) References Cited

U.S. PATENT DOCUMENTS

| | | |
|---|---|---|
| 4,769,587 A | 9/1988 | Pettigrew |
| 4,857,821 A | 8/1989 | Takeda |
| 4,891,569 A | 1/1990 | Light |
| 4,916,377 A | 4/1990 | Terada et al. |
| 4,974,140 A | 11/1990 | Iba et al. |
| 4,999,565 A | 3/1991 | Nilsson |
| 5,099,190 A | 3/1992 | Sato |
| 5,117,175 A | 5/1992 | Pettigrew et al. |
| 5,134,356 A | 7/1992 | El-Sharkawi et al. |
| 5,422,561 A | 6/1995 | Williams et al. |
| 5,539,653 A | 7/1996 | Pomatto |
| 5,541,498 A | 7/1996 | Beckwith |
| 5,594,659 A | 1/1997 | Schlueter |
| 5,610,834 A | 3/1997 | Schlueter |
| 5,670,864 A | 9/1997 | Marx et al. |
| 5,734,586 A | 3/1998 | Chiang et al. |
| 5,760,492 A | 6/1998 | Kanoi et al. |
| 5,796,628 A | 8/1998 | Chiang et al. |
| 5,798,634 A | 8/1998 | Terada et al. |
| 5,896,302 A | 4/1999 | Goodpaster |
| 5,900,723 A | 5/1999 | Rostron |
| 5,963,457 A | 10/1999 | Kanoi et al. |
| 5,999,430 A | 12/1999 | Aritsuka |
| 6,005,759 A | 12/1999 | Hart et al. |
| 6,058,353 A | 5/2000 | Goodpaster |
| 6,297,940 B1 | 10/2001 | Wu |
| 6,452,289 B1 | 9/2002 | Lansberry et al. |
| 6,492,801 B1 | 12/2002 | Sims et al. |
| 6,549,880 B1 | 4/2003 | Willoughby et al. |
| 6,625,520 B1 | 9/2003 | Chen et al. |
| 6,633,823 B2 | 10/2003 | Bartone et al. |
| 6,653,821 B2 | 11/2003 | Kern et al. |
| 6,745,109 B2 | 6/2004 | Kojima et al. |
| 6,772,052 B1 | 8/2004 | Amundsen et al. |
| 6,906,434 B1 | 6/2005 | Koeppe et al. |
| 6,915,185 B2 | 7/2005 | Yamamoto et al. |
| 6,925,362 B2 | 8/2005 | Machitani et al. |
| 6,987,331 B2 | 1/2006 | Koeppe et al. |
| 7,002,260 B2 | 2/2006 | Stahlkopf |
| 7,069,117 B2 | 6/2006 | Wilson et al. |
| 7,091,703 B2 | 8/2006 | Folts et al. |
| 7,288,921 B2 | 10/2007 | Huff et al. |
| 7,398,194 B2 | 7/2008 | Evans et al. |
| 7,423,412 B2 | 9/2008 | Weng et al. |
| 7,474,080 B2 | 1/2009 | Huff et al. |
| 7,584,066 B2 | 9/2009 | Roytelman |
| 7,595,563 B2 | 9/2009 | Wobben |
| 7,626,497 B2 | 12/2009 | Mollenkopf |
| RE41,170 E | 3/2010 | Hubert et al. |
| 7,714,592 B2 | 5/2010 | Radtke et al. |
| 7,783,390 B2 | 8/2010 | Miller |
| 7,804,280 B2 | 9/2010 | Deaver, Sr. et al. |
| 2008/0177678 A1 | 7/2008 | Di Martini et al. |
| 2008/0195255 A1 | 8/2008 | Lutze et al. |
| 2009/0024255 A1 | 1/2009 | Penzenstadler et al. |
| 2009/0033296 A1 | 2/2009 | Hammerstrom |
| 2009/0265042 A1 | 10/2009 | Mollenkopf et al. |
| 2010/0204851 A1 | 8/2010 | Yuen et al. |
| 2012/0022713 A1* | 1/2012 | Deaver et al. ............... 700/298 |
| 2013/0030579 A1* | 1/2013 | Milosevic et al. ........... 700/286 |
| 2013/0030586 A1* | 1/2013 | Milosevic et al. ........... 700/292 |
| 2013/0030598 A1* | 1/2013 | Milosevic et al. ........... 700/298 |

OTHER PUBLICATIONS

"Knowledge-Base System for Supervision and Control of Region Voltage Profile and Security" by Alessando et al.; IEEE Transaction on Power Systems, vol. 20, No. 40, Feb. 2005, pp. 400-407.*
U.S. Appl. No. 13/191,415, filed Jul. 26, 2011, Borka Milosevic et al.
U.S. Appl. No. 13/191,420, filed Jul. 26, 2011, Borka Milosevic et al.
U.S. Appl. No. 13/191,409, filed Jul. 26, 2011, Borka Milosevic et al.
U.S. Appl. No. 13/191,400, filed Jul. 26, 2011, Borka Milosevic et al.
Feliachi, A.; "Optimal Decentralized Load Frequency Control," IEEE vol. PWRS-2, No. 2, pgs. 379-385 (May 1987).

* cited by examiner

DEVICES AND METHODS FOR DECENTRALIZED COORDINATED VOLT/VAR CONTROL

BACKGROUND

The subject matter disclosed herein relates to decentralized, coordinated control of equipment associated with an electrical distribution system to optimize voltage and active power losses in light of one another (Volt/VAR) while keeping power factor within a desired range Electrical power provided over an electrical distribution system typically must remain within a range of acceptable voltages (e.g., ±5% of 120V, or between approximately 114V and 126V). In an effort to keep the voltages of the electrical distribution system within such a range, a variety of equipment may be placed throughout the distribution system. This equipment may include, for example, a load tap changing (LTC) transformer, voltage regulators, and distribution capacitor banks. Conventionally, each of these may be regulated according to a distributed control scheme, in which a local controller may individually control each piece of equipment. While a distributed control scheme may keep the voltage of the electrical distribution system within the prescribed limits, it may not optimize other operational parameters, such as active power losses, power factor, and/or the flatness of the voltage across a segment of the electrical distribution system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a controller includes a network interface and data processing circuitry. The network interface may receive first measurements associated with a segment of an electrical distribution system and transmit a control signal configured to control equipment of the segment of the electrical distribution system. The data processing circuitry may determine a total load on the segment of the electrical distribution system and run a first simulation of the segment of the electrical distribution system simulating various equipment configurations based at least in part on the first measurements. The data processing circuitry may select from among the various equipment configurations, depending at least in part on the total load, one of several different equipment configurations. The data processing circuitry also may generate the control signal, which may cause the equipment of the segment of the electrical distribution system to conform to the selected equipment configuration. By way of example, a first equipment configuration may cause a voltage deviation of the segment of the electrical distribution system to most closely approach a first desired value without causing voltage violations or power factor to fall beneath a power factor threshold. A second equipment configuration may cause the voltage deviation of the segment of the electrical distribution system to more closely approach the first desired value than otherwise and active power losses of the segment of the electrical distribution system to more closely approach a second desired value than otherwise without causing voltage violations or power factor to fall beneath the power factor threshold. A third equipment configuration may cause the active power losses of the segment of the electrical distribution system to most closely approach the second desired value without causing voltage violations or power factor to fall beneath the power factor threshold.

In a second embodiment, a method may involve determining, using a first substation application platform associated with a first segment of an electrical distribution system or a second substation application platform associated with a second segment of the electrical distribution system, an estimated cost of generating power at a current or future time period on the first segment of an electrical distribution system or the second segment of the electrical distribution system, or both. Additionally, the method may involve determining to run a voltage control function, a Volt/VAR control function, a power loss reduction function, a power factor control function, or a combination thereof, based at least in part on the estimated cost of generating power. By way of example, the voltage control function to cause a voltage deviation of the first segment or the second segment, or both, to most closely approach a first desired value without causing voltage violations or power factor to fall beneath a power factor threshold. The Volt/VAR control function to cause the voltage deviation of the first segment or the second segment, or both, to more closely approach the first desired value than otherwise and active power losses of the first segment or the second segment, or both, to more closely approach a second desired value than otherwise without causing voltage violations or power factor to fall beneath the power factor threshold. The power loss reduction function to cause the active power losses of the first segment or the second segment, or both, to most closely approach the second desired value without causing voltage violations or power factor to fall beneath the power factor threshold. The power factor control function to cause the power factor to most closely approach a desired power factor value.

In a third embodiment, an article of manufacture includes one or more tangible, machine-readable storage media having instructions encoded thereon for execution by a processor of an electronic device. The instructions include instructions to receive measurements associated with a feeder of an electrical distribution system, instructions to determine an expected load on the feeder at a present or future time period, instructions to simulate a distribution power flow of the feeder according to various capacitor switching configurations of at least one capacitor of the feeder using the measurements, and instructions to determine an expected voltage deviation, reduction in power loss, and power factor associated with the various capacitor switching configurations based at least in part on the simulated distribution power flow of the feeder. In addition, the instructions include instructions to select a non-dominated capacitor switching configuration from among various capacitor switching configurations that causes a voltage deviation to most closely approach a first desired value, that causes the voltage deviation of the segment of the electrical distribution system to more closely approach the first desired value than otherwise and active power losses of the segment of the electrical distribution system to more closely approach a second desired value than otherwise, or that causes the active power losses of the segment of the electrical distribution system to most closely approach the second desired value based at least in part on the expected load on the feeder at the present or future time period. The instructions may further include instructions to control capacitors of the feeder according to the selected non-dominated capacitor switching configuration during the present or future time period.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
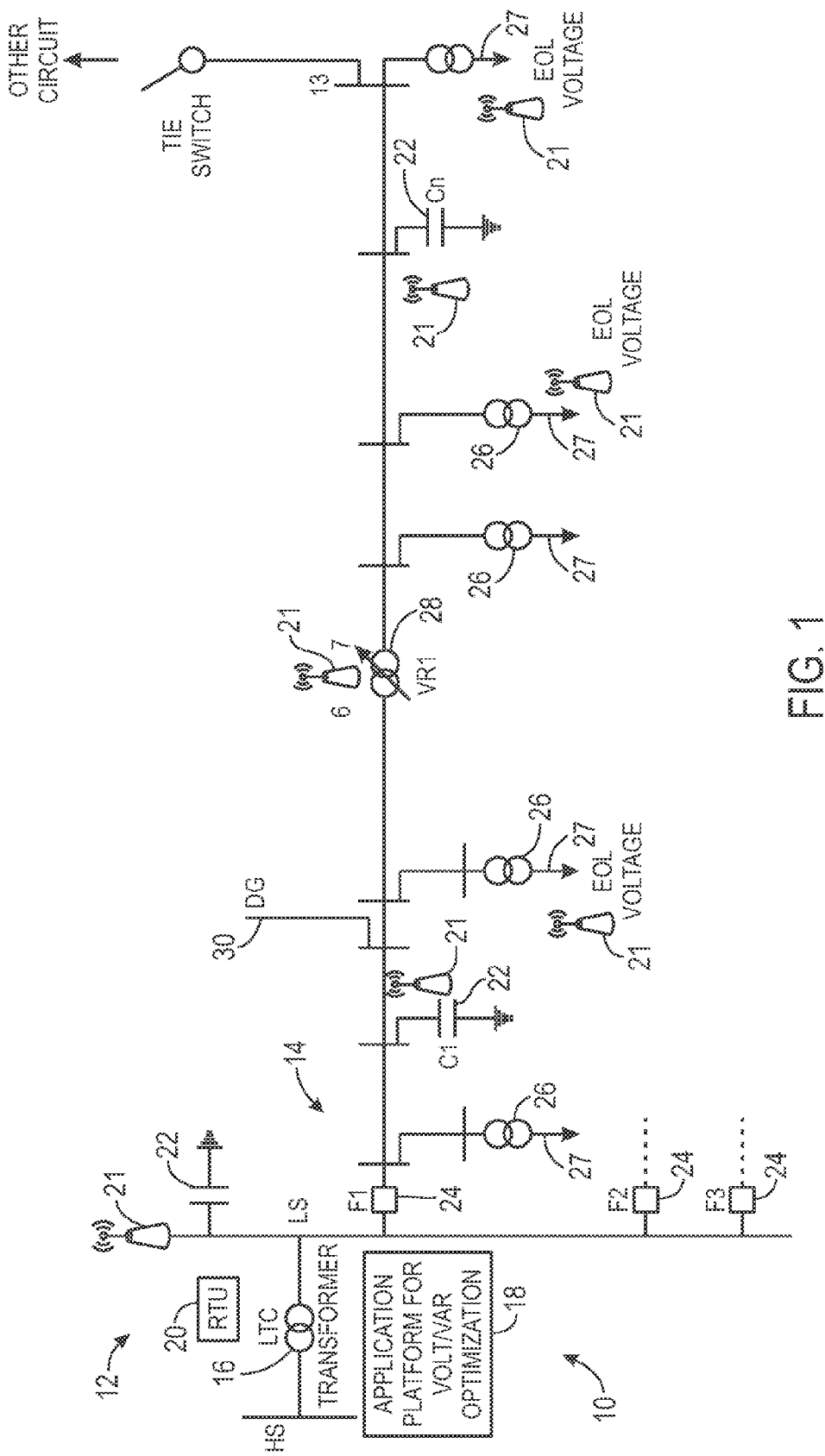
FIGS. 1 and 2 are one-line drawings of an electrical distribution system that can be optimized for a desired operational parameter such as power factor, active power losses, voltage, and/or voltage and active power losses in light of one another (Volt/VAR) while keeping power factor within a desired range via decentralized coordinated control, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure relate to techniques for controlling equipment on segments of an electrical distribution system via decentralized coordinated control. As used herein, the term "decentralized coordinated control" refers to a decentralized manner of controlling electrical distribution system equipment (e.g., load tap changing (LTC) transformers, voltage regulators, and/or distribution capacitor banks) using an application platform for Volt/Var optimization located at the substation level and not in a utility back office. That is, rather than allowing each piece of equipment of the electrical distribution system to operate independently according to a distributed control scheme, the application platform for Volt/Var optimization may control many pieces of equipment in a segment of the electrical distribution system in a coordinated manner. This decentralized coordinated control may be used to "optimize" various operational parameters of the electrical distribution system, including, among other things, a power factor on the electrical distribution system. As used herein, the term "optimize" means to generally improve over conventional, local control schemes. Thus, when a segment of an electrical distribution system is optimized for power factor, the segment of the electrical distribution system may be understood to have a better power factor than would generally be obtained using conventional, local control schemes. The terms "optimize" or "optimization" do not mean that no other, better values of power factor are possible, only that these values are improved or more closely approach a desired value than conventional control schemes (e.g., a desired $pf_{des}$).

A segment of an electrical distribution system may include a feeder supplied with power by a substation. Accordingly, as will be discussed below, the application platform for Volt/Var optimization may optimize certain parameters (e.g., power factor) at the substation level and/or the feeder level. In addition, using the same general techniques, the application platform for Volt/Var optimization may even optimize power factor on a segment of an electrical distribution system that has been restored after a fault.

Figure 2:
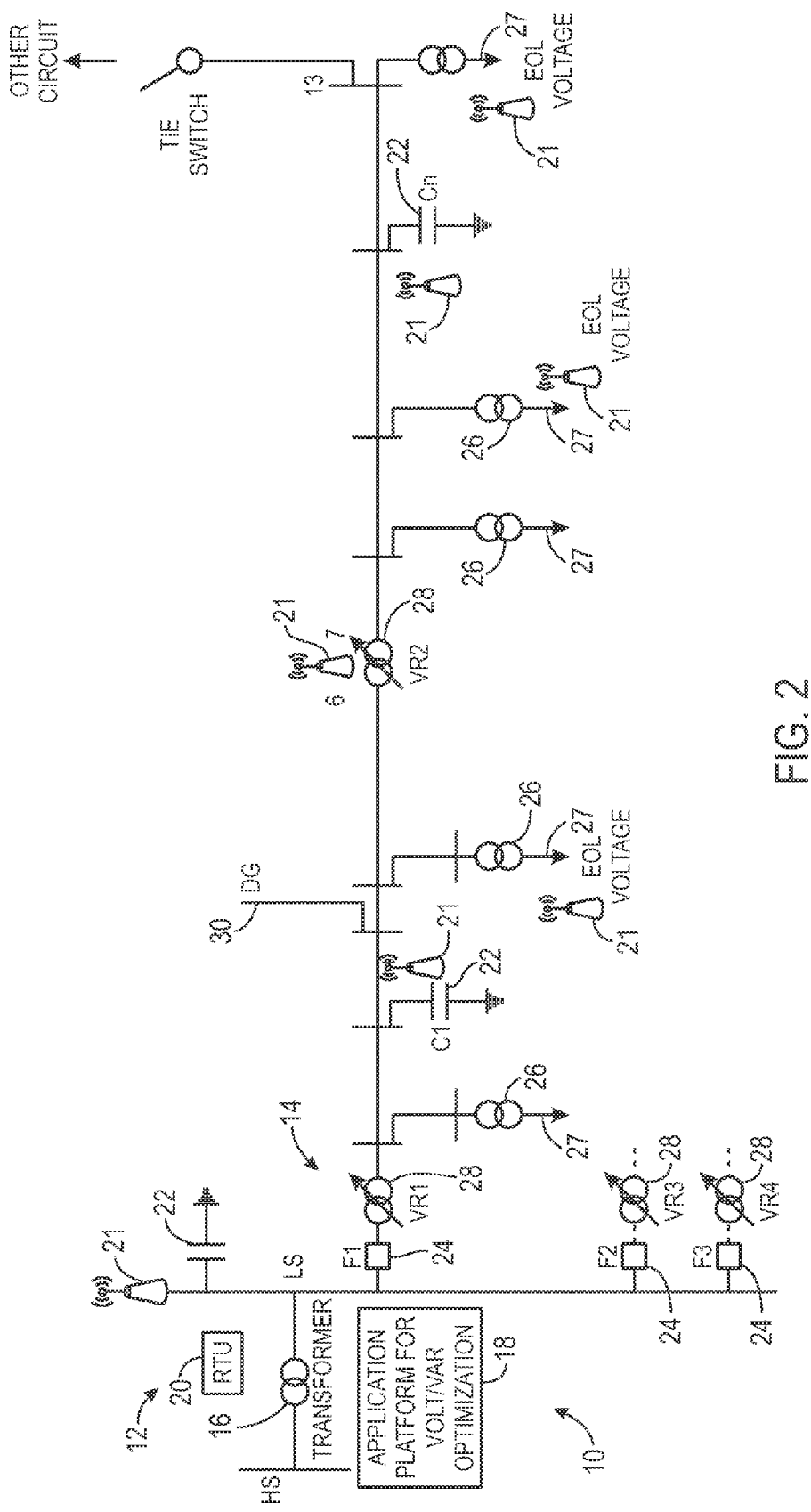

FIGS. 1 and 2 represent two respective embodiments of segments of an electrical distribution system 10 that can be optimized for power factor using the decentralized coordinated control techniques described herein. In FIG. 1, a substation 12 feeds power directly to feeders 14 via a load tap changing (LTC) transformer 16. In contrast, in FIG. 2, the substation 12 provides power to the feeders 14 via transformer without LTC and respective voltage regulators (VRs) 28. In either embodiment, an application platform for Volt/Var optimization 18, which may be associated with and/or located at the substation 12, can optimize the electrical distribution system 10 for power factor according to the decentralized coordinate control techniques discussed herein. Moreover, although the following discussion refers to FIG. 1 in particular, any discussion of like elements of the embodiment of FIG. 1 should be understood as generally applicable to the embodiment of FIG. 2.

As noted above, FIG. 1 is a one-line diagram of the substation 12 that may supply power to the feeders 14 of the electrical distribution system 10. The substation 12 may include, for example, a load tap changing (LTC) transformer 16 that transforms high side (HS) voltage to a low side (LS) voltage within a defined range (e.g., so that the voltage on the feeder is within 120V±5% (between 114V and 126V)). An application platform for Volt/Var optimization 18 associated with the substation 12 may perform decentralized coordinated control of various equipment at the substation 12 or the feeder 14, communicating with this equipment in any suitable way (e.g., via a communication device 21 that may interface with a remote terminal unit (RTU) 20). The application platform for Volt/Var optimization may optimize power factor on the substation 12 by controlling, distribution capacitor banks 22. These distribution capacitor banks 22 are also referred to herein as capacitors 22. When a capacitor 22 is on (e.g., closed), some amount of reactive power (VAR) will be injected into the feeder 14 through the capacitor 22. By varying which capacitors 22 are switched on or off, the amount of reactive power may vary. Consequently, operational parameters of the electrical distribution system 10, such as power factor, active power losses, voltage deviation over the length of the feeder 14, and so forth, may vary. Breakers 24 are between the feeder 14 and the substation 12.

As shown in FIGS. 1 and 2, each feeder 14 supplies power to various distribution transformers 26 and consequently to loads 27. These loads 27 may draw varying amounts of real power (W) and reactive power (VAR). Power factor on feeder 14 depends on the amount of active and reactive power load on the feeder 14. To provide one brief example, power factor (i.e., the ratio of real power to total power drawn) on the feeders 14 may be low in the summertime because many of the loads 27 may be highly reactive induction motors for air conditioning. As the voltage across a feeder 14 drops or rises, the LTC transformer 16 (or, alternatively, the voltage regulators (VRs) 28) regulate the voltage across the length of the feeder 14 to keep the maximum and minimum voltages within the defined range (e.g., between 114V and 126V). The LTC transformer 16 and/or voltage regulators (VRs) 28 each may include selectable tap positions that can be controlled from the application platform for Volt/Var optimization 18. These different tap positions may cause a voltage regulator (VR) 28 to increase or decrease the voltage on its low side (LS) bus to a different degree. Distributed generation (DG) 30 may inject power into the feeder 14, effectively acting as an inverse load 27.

Figure 3:
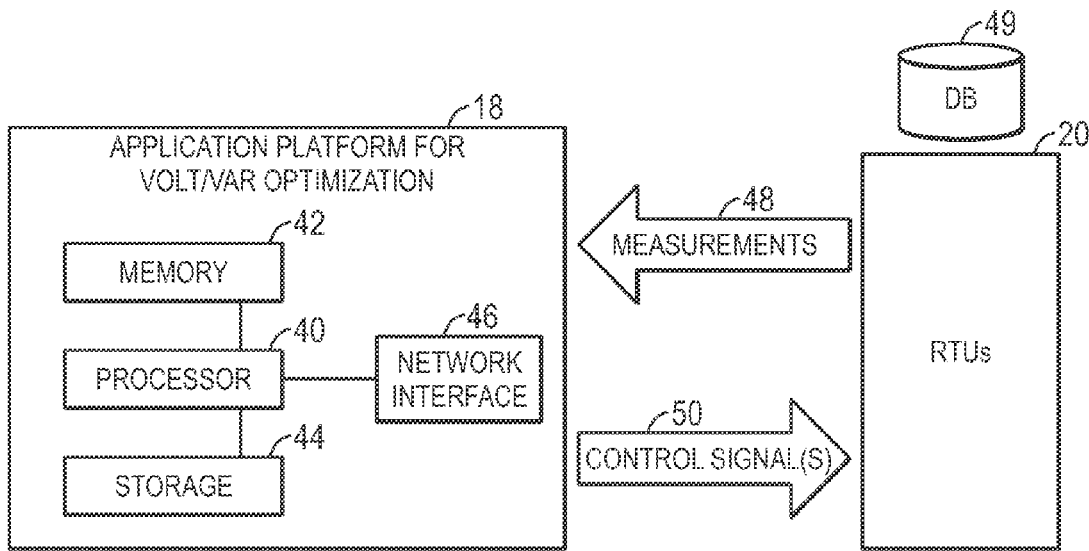
FIG. 3 is a block diagram of an application platform of a substation that can optimize a desired operational parameter of the electrical distribution system of FIGS. 1 and/or 2 via decentralized coordinated control, in accordance with an embodiment.

As mentioned above, to manage certain operational parameters of the electrical distribution system 10 (e.g., the power factor on the electrical distribution system 10), the application platform for Volt/Var optimization 18 may control the distribution capacitor banks 22 and voltage regulators (VRs) 28 of the feeders 14 and/or the substation 12. One example of the application platform for Volt/Var optimization 18 appears in FIG. 3, which may perform various algorithms to determine a configuration for the various equipment of the electrical distribution system 10 that may optimize power factor. Although the application platform for Volt/Var optimization 18 is shown in FIG. 3 to be associated with the substation 12, the application platform for Volt/Var optimization 18 may instead be at any other suitable location in the electrical distribution system 10. The application platform for Volt/Var optimization 18 may include a processor 40, memory 42, and storage 44. Operably coupled to the memory 42 and/or the storage 44, the processor 40 may carry out the presently disclosed techniques based on instructions executable by the processor 42. These instructions may be stored using any suitable article of manufacture that includes one or more tangible machine-readable media at least collectively storing these instructions. The memory 42 and/or the nonvolatile storage 44 may represent such articles of manufacture capable of storing these instructions, and may include, for example, random-access memory, read-only memory, rewritable flash memory, a hard drive, and/or optical discs.

A network interface 46 may receive a variety of measurements 48 from the filed devices (e.g., the capacitor banks 22 and/or voltage regulators (VRs) 28, etc.) either directly or through remote terminal units (RTUs) 20. Using these measurements, the application platform for Volt/Var optimization 18 may simulate the feeders 14 in a variety of equipment configurations (e.g., distribution capacitor bank 20 switching configurations and/or voltage regulator (VR) 28 tap positions). Based at least partly on these simulations, the application platform for Volt/Var optimization 18 may generate control signals 50 for controlling the equipment substation 12 and/or feeders 14 to optimize power factor.

The application platform for Volt/Var optimization 18 may follow a general set of guidelines in carrying out the power factor optimization techniques disclosed herein. In particular, the control signals 50 from the application platform for Volt/Var optimization 18 may control the capacitors 22 and voltage regulators (VRs) 28 installed along the length of the feeder 14, and/or the capacitors 22 and the LTC transformer 16 and/or voltage regulators (VRs) 28 installed at the substation 12. To aid in simulation, geographical information for each feeder 14 may be known by the application platform for Volt/Var optimization 18, and all available measurements 48 from the equipment of the substation 12 and feeders 14 may include some indication of the time the measurements 48 were taken (e.g., the measurements 48 may be time-stamped). As will be discussed below, these measurements 48 can be used by the application platform for Volt/Var optimization 18 to calculate unknown voltages and current at nodes of the feeders 14. In addition, to aid certain other application platform for Volt/Var optimizations 38 that are controlling other feeders 14 of the electrical distribution system 10, the application platform for Volt/Var optimization 18 may "publish" the minimum and maximum voltage and the equivalent impedance of each of the feeders 14 under its control to these other application platform for Volt/Var optimizations 38. Moreover, when the application platform for Volt/Var optimization 18 is controlling a substation 12 and feeders 14, the application platform for Volt/Var optimization 18 may not change the status or settings of the equipment of the substation 12 and the feeders 14 at the same. Furthermore, the application platform 18 may control the voltage regulators (VRs) 28 and distribution capacitor banks 22 unless communication to the voltage regulators (VRs) 28 and distribution capacitor banks 22 fails. When communication fails, the voltage regulators (VRs) 28 and distribution capacitor banks 22 revert back to their local settings. Otherwise, the voltage regulators (VRs) 28 and distribution capacitor banks 22 will remain under the control of the application platform for Volt/Var optimization 18. Finally, when the application platform for Volt/Var optimization 18 begins to carry out power factor optimization, the voltage regulator (VRs) 28 taps will initially be locked in their most recent position.

It should be noted that application platform for Volt/Var optimization 18 can control the capacitor banks 22 and/or voltage regulators (VRs) 28 in a variety of ways. For example, the application platform for Volt/Var optimization 18 may send settings to appropriate device controllers that can control the devices. Additionally or alternatively, the application platform for Volt/Var optimization 18 may send commands to the capacitor banks 22 and/or voltage regulators (VRs) 28 (e.g., TRIP/CLOSE for a capacitor bank 22 and RAISE/LOWER for the LTC transformer 16 or voltage regulator (VR) 28). It may be appreciated that sending commands to a voltage regulator (VR) 28 in the field may be slow at times, and thus it may be more desirable to send changes in settings to the appropriate device controllers. In the present disclosure, both the direct issuing of commands to feeder 14 equipment and the changing of settings may be referred to as providing or issuing a control signal or a command.

The application platform for Volt/Var optimization 18 may follow the above guidelines at least partly by relying on the measurements 48. A general minimum set of measurements 48 may be given as follows: (1) voltage (magnitude) at the substation 12 low side (LS) bus, (2) voltage (magnitude) at capacitor 22 locations, (3) voltage (magnitude) at low side (LS) locations of voltage regulators (VR) 28 and their tap positions, (4) kW and kVAr flows at capacitor 22 locations and all junction points (e.g., points at which a lateral is connected to a main feeder 14) between capacitor 22 and voltage regulator (VR) 28 locations and the substation 12, (5) kW and kVAr at the substation 12 low side (LS) bus and kW and kVAr measurements from each feeder 14 (alternatively, kW and kVAr measurements from each feeder 14 and transformer 16 test data may be used to calculate kW and kVAr a the substation 12 low side (LS) bus), (6) kW and kVAr demand from each large commercial and/or industrial load 27 between the substation 12 and any of the capacitors 22 and voltage regulators (VRs) 28, and (7) end of line (EOL) voltages (if unavailable, the voltage drop between the last measurement point and the end of the feeder 14 may otherwise be provided in another manner). In addition, it should be noted that if the feeders 14 have any distributed generation (DG) 30, additional voltage measurement points may be needed because the minimum voltage of the feeder 14 may not be the end of line (EOL) voltage. Additionally or alternatively, the voltages on the feeder 14 may be estimated using approximate equations. For such an approach, the impedance of the feeder 14 would need to be known or estimated.

As mentioned above, the application platform for Volt/Var optimization 18 may optimize power factor based at least in part on a simulation of the distribution power flow across the electrical distribution system 10. Equivalent circuit diagrams and one-line diagrams represented by FIGS. 4-12, discussed below, generally illustrate the basis upon which the application platform for Volt/Var optimization 18 may perform this simulation of the distribution power flow across portions of the electrical distribution system 10. Although the equivalent circuits of FIGS. 4-12 represent approximations of actual segments of the electrical distribution system 10, these approximations are believed to simulate segments of the electrical distribution system 10 with sufficient accuracy to enable the application platform for Volt/Var optimization 18 to optimize power factor in the electrical distribution system 10.

Figure 4:
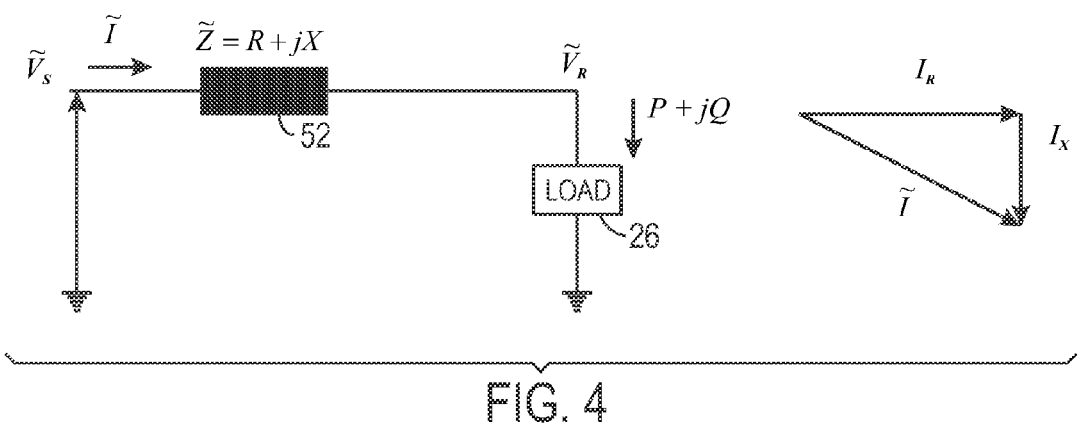
FIGS. 4-8 represent equivalent circuits modeling segments of the electrical distribution system of FIGS. 1 and/or 2, in accordance with an embodiment.

FIG. 4 presents a line-to-neutral equivalent circuit modeling a feeder 14 with a line segment with impedance 52. In the equivalent circuit of FIG. 4, this feeder 14 serves load 27, here represented as a single equivalent load. Kirchhoff's Voltage Law applied to the circuit of FIG. 4 gives the following:

$$\tilde{V}_S = \tilde{V}_R + \tilde{Z}\tilde{I}$$

where $\tilde{Z}=R+jX$ is the impedance 52 of the line segment. The current vector $\tilde{I}$ appears in FIG. 4 alongside the equivalent circuit, and represents the sum of both real and reactive current components $\tilde{I}=I_R+jI_X$. The voltage drop, $V_{drop}$, across the line segment is defined as a difference between the magnitudes of the source voltage $\tilde{V}_S$ and the load voltage $\tilde{V}_R$:

$$\Delta V_{drop} = |\tilde{V}_S| - |\tilde{V}_R|.$$

Figure 5:
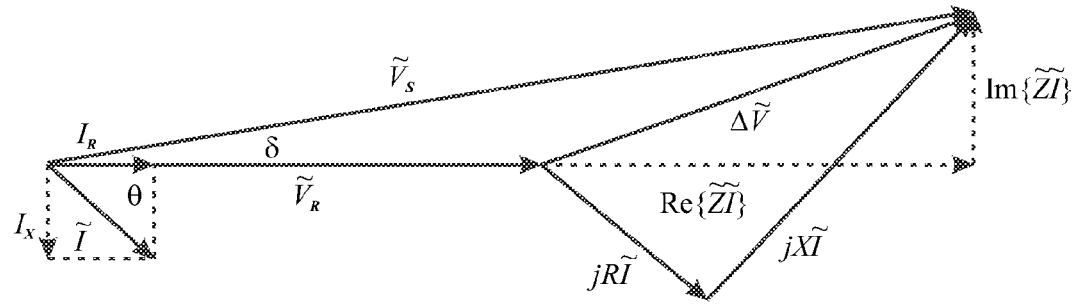

Because of the small phase angle difference between the source voltage $\tilde{V}_S$ and the load voltage $\tilde{V}_R$, as illustrated in a phasor diagram of FIG. 5, the voltage drop between the source and load voltage is approximately equal to the real part of the voltage drop across the impedance $\tilde{Z}$, or $\Delta \tilde{V} = \tilde{Z}\tilde{I}$:

$$\Delta V_{drop} \approx Re\{\tilde{Z}\tilde{I}\} = RI_R + XI_X,$$

where $\tilde{I} = I_R + jI_X$.

The voltage drop $\Delta V_{drop}$ is a function of both R and X, where R is mostly a function of wire size and X is mostly a function of the conductor spacing. In the electrical distribution system 10, the ratio of ratio of X/R generally may be greater than 2. It therefore may be noted that the voltage drop $\Delta V_{drop}$ across a feeder 14 of the electrical system 10 could be reduced by using larger, and usually more expensive, wires to lower the value of R, or by installing capacitors 22 to reduce the flow on reactive power (VAR).

Figure 6:
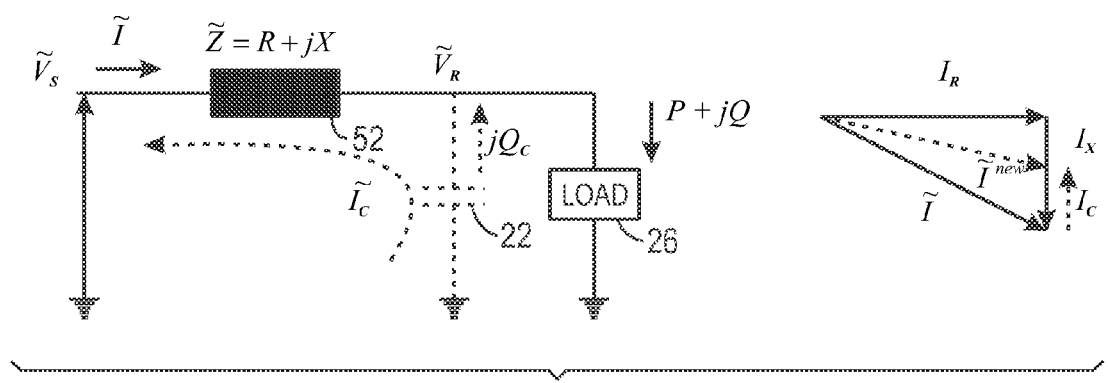

Indeed, as noted above, the electrical distribution system 10 may include a variety of capacitors 22. Strategically switching these capacitors 22 on or off can effectively reduce the flow on reactive power through the feeder 14. An equivalent circuit representing a feeder 14 having a shunt capacitor 22 appears in FIG. 6. When the shunt capacitor 22 is on, the shunt capacitor 22 will inject a current, $I_C$, that reduces the imaginary component of the current, $I_X$, and, accordingly, the magnitude of the total current I. The reduction of the imaginary component of the current $I_X$ flowing through the line segment will effectively reduce the amount of voltage drop $\Delta V_{drop}$ across the line segment. For the equivalent circuit shown in FIG. 6, the voltage drop $\Delta V_{drop}$ may be given as:

$$\Delta V_{drop} \approx RI_R + X(I_X - I_C),$$

and the voltage rise of the circuit of FIG. 6 may be given as:

$$\Delta V_{rise} \approx XI_C.$$

It should be understood that the equation above may approximate the effect of a capacitor 22 switching on on the feeder 14 voltage profile. From this equation, it may be seen that if the capacitor 22 is the capacitor is oversized (i.e., $I_X - I_C < 0$), the system may be overcompensated and the voltage drop in the line segment $\Delta V_{drop}$ may become negative. Consequently, the load voltage, $V_R$, may become higher than the source voltage, $V_S$. This condition may occur if capacitors 22 installed on the feeder 14 were not adequately located or sized, or when certain sections of the feeder 14 need to be overcompensated to achieve better voltage flattening along the feeder 14 and its laterals. The effect of switching the capacitor 22 on or off in the circuit of FIG. 6 may also effect power losses. The active power loss on the line segment of the circuit of FIG. 6 while the capacitor 22 is switched off (e.g., the condition illustrated by FIG. 4), may depend on the impedance 52 of the line segment and the square of the current, I, flowing through it:

$$P_{loss} = RI^2 = R(I_R^2 + I_X^2).$$

These active power losses can also be calculated as:

$$P_{loss} = \frac{R}{V_R^2}(P^2 + Q^2) \text{ or } P_{loss} = \Delta V^2 \frac{R}{Z^2} \approx \Delta V_{drop}^2 \frac{R}{Z^2}$$

Switching on the shunt capacitor 22 in the circuit of FIG. 6 may reduce a power loss component of the line segment due to the reactive power flow, Q, (and the imaginary component of the current, $I_X$), consequently reducing the total power loss, as represented by the following relationship:

$$P_{loss}^{new} = R(I_R^2 + (I_X - I_C)^2), \text{ or}$$

$$P_{loss}^{new} = \frac{R}{V_R^2}(P^2 + (Q - Q_C)^2), \text{ or}$$

$$P_{loss} \approx (\Delta V_{drop} - \Delta V_{rise})^2 \frac{R}{Z^2}.$$

Changes in the real power loss P loss of the line segment due to reactive compensation in the circuit can be calculated as:

$$\Delta P_{loss} \approx RI_X^2 - R(I_X - I_C)^2.$$

Here, it may be noted that if the capacitor 22 is oversized (i.e., $I_X - I_C < 0$), the circuit of FIG. 6 may be overcompensated. Likewise, the losses in the circuit will increase if $I_C > 2I_X$. The equation below may be used to approximate the effect of a capacitor 22 switching on the active losses of the feeder 14:

$$\Delta P_{LOSS} = \sum_{i,j} \left( R_{i,j} I_{X_{i,j}}^2 - R_{i,j} (I_{X_{i,j}} - I_{C_k})^2 \right),$$

where $R_{i,j}$ is a resistance of the line segment between nodes i and j, $I_{X_{i,j}}$ is the imaginary component of the current on the line segment between nodes i and j, and $I_{C_k}$ is the current of capacitor k.

The power factor on a feeder 14 may also be affected by a capacitor 22. Namely, since power factor depends on the shift between the voltage and current phasors (e.g., as illustrated in FIG. 5), the power factor on the substation 12 or feeder 14 may vary when a capacitor 22 is switched on or off. Indeed, as shown by the phasor representation of FIG. 5, when voltage and current fall farther apart in terms of phase angle θ, (i.e., as power factor worsens), a larger percentage of the power flow is reactive (VAR) rather than real (W). Power factor may be represented according to the following relationship:

$$pf = \cos(\theta) = \frac{P}{\sqrt{P^2 + Q^2}}.$$

Typically, the power factor may be lagging (i.e., the current phasor may be "behind" the voltage phasor). From the equation above, it is apparent that power factor may be a fraction ranging from 0 to 1. For example, a power factor on 1 means that there is no reactive power flowing in the circuit, while a power factor on 0.9 means that 10% of the power is lost due to reactive effects. It should be noted that during summer, power factor on a feeder 14 may be relatively low because of the high reactive load of air conditioning induction motors during peak loading time. Off-season, both real and reactive loads are typically far below their summer values, and VAR loads lessen more than active power, so power factor on a feeder 14 may improve considerably at these times.

Since, as noted above, capacitors 22 switched on may inject opposing reactive power (VARs) into the system, as generally shown in FIG. 6, switching on such a capacitor 22 may affect the power factor on a feeder 14 and/or a substation 12. A new power factor PF new that occurs when a capacitor 22 is switched may be modeled according to the following equation:

$$pf^{new} = \frac{P - \Delta P_{LOSS}}{\sqrt{(P - \Delta P_{LOSS})^2 + (Q - \Delta Q_{LOSS} - Q_C)^2}} \approx \frac{P}{\sqrt{P^2 + (Q - Q_C)^2}},$$

where $\Delta P_{LOSS}$ is the total active power loss reduction on the feeder 14. This total active power loss reduction may be calculated as follows:

$$\Delta P_{LOSS} = \sum_{i,j} \Delta P_{loss\,i,j},$$

where i,j refer to a line segment in the electrical distribution system 10 between two nodes i and j.

Likewise, $\Delta Q_{LOSS}$ represents the total reactive power loss reduction on the feeder 14, and may be calculated according to the following relationship:

$$\Delta Q_{LOSS} = \sum_{i,j} \Delta Q_{loss\,i,j},$$

where i,j refer to a line segment between two nodes i and j in the electrical distribution system 10.

This reactive power loss reduction, $\Delta Q_{loss}$, may be calculated according to the following equation:

$$\Delta Q_{loss_{i,j}} = X_{i,j} I_{X_{i,j}}^2 - X_{i,j}(I_{X_{i,j}} - I_{C_k}),$$

where $X_{i,j}$ is a reactance of the line segment between nodes i and j, $I_{X_{i,j}}$ is the imaginary component of the current on the line segment between buses i and j and $I_{C_k}$ is the current of capacitor k.

Figure 7:
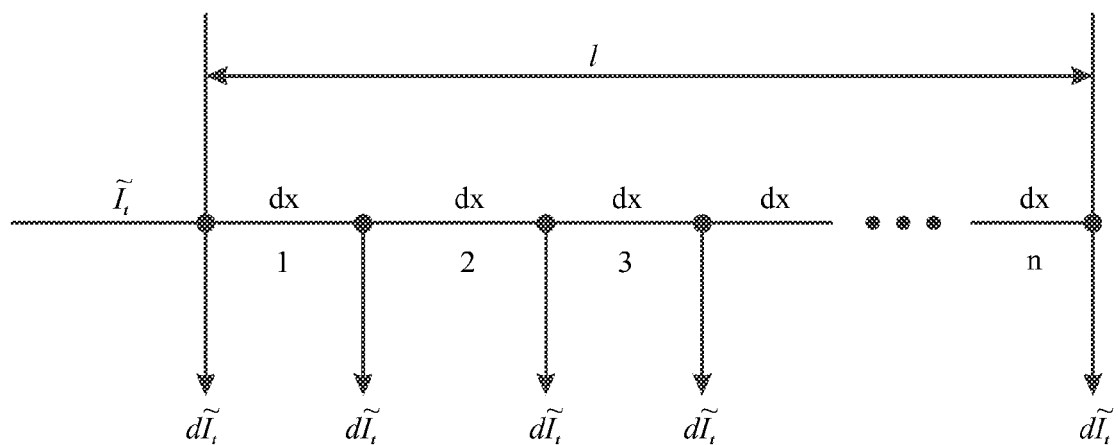

A feeder 14 may seldom have only one load 27, as illustrated in FIGS. 4-6. As such, when the application platform 18 simulates the feeder 14, the application platform 18 may undertake additional calculations. When the loads 27 are uniformly distributed (e.g., same rating distribution load tap changing (LTC) transformers 16 spaced uniformly over a length of a lateral segment of the electrical distribution system 10), as schematically represented in FIG. 7, it may not be necessary to model each load 27 to determine the total voltage drop from source to end over a length L. Under such conditions, the total voltage drop along a feeder 14 may be given as:

$$\Delta V_{drop}^{total} = \text{Re}\left\{\frac{1}{2}\tilde{Z}\tilde{I}_t\left(1 + \frac{1}{n}\right)\right\},$$

where $\tilde{Z} = R + jX$ represents the total per phase impedance from the source to the end of the line and $\tilde{I}_t$ represents the total current into the feeder 14. If the number of nodes is assumed to go to infinity, the total three-phase power losses may be given by the following relationship:

$$V_{drop}^{total} = \text{Re}\left\{\frac{1}{2}\tilde{Z}\tilde{I}_t\right\}.$$

Total three-phase power losses thus may be given as:

$$P_{loss}^{total} = 3RI_t^2\left(\frac{1}{3} + \frac{1}{2n} + \frac{1}{6n^2}\right).$$

Accordingly, if the number of nodes of the feeder 14 goes to infinity, the three-phase power losses may be calculated according to the following relationship:

$$P_{loss}^{total} = RI_t^2.$$

Distribution Power Flow Simulation

Figure 8:
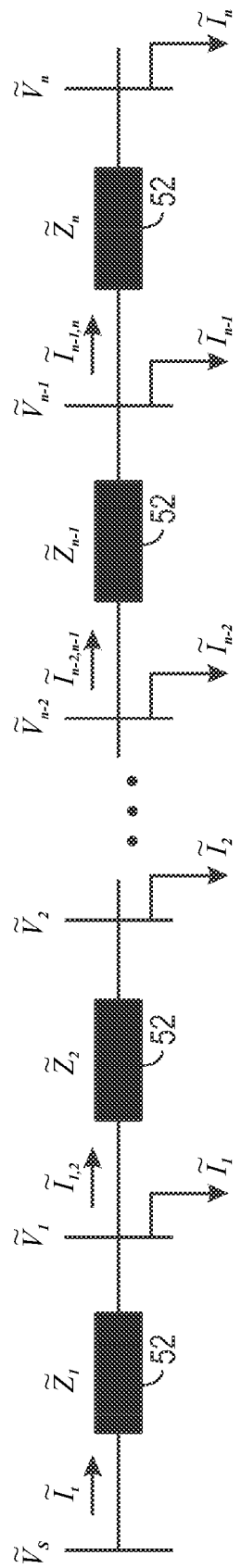

As will be discussed below, the application platform for Volt/Var optimization 18 may perform a distribution power flow simulation to simulate the effect on a feeder 14 of various equipment configurations. By comparing various distribution power flow simulations for various equipment configurations, the application platform for Volt/Var optimization 18 may determine which of these configurations optimize the power factor on the feeder 14 and/or the substation 12. The application platform for Volt/Var optimization 18 may calculate the distribution power flow on a distribution feeder 14 using backward/forward sweep iterative methods. For example, as shown by a line-to-neutral equivalent circuit of a feeder 14 shown in FIG. 8, given the voltage at the substation $\tilde{V}_S$, and a known load 27 model at each feeder 14 bus (e.g., involving constant complex power, constant impedance, constant current, or some combination thereof), a distribution power flow calculation may determine voltages at all other buses, $\tilde{V}_i$, where i=1, . . . , n, as well as currents in each line section. The distribution power flow simulation may determine (1) power flow in each section of the feeder 14 (e.g., kW, kVAr, and pf), (2) power loss in each section and total power loss, (3), total feeder power input in kW and kVAr, and (4) load kW and kVAr based on a specified model of the load 27.

The application platform for Volt/Var optimization 18 may perform a distribution power flow analysis using a backward/forward sweep iterative method. In a backward sweep, Kirchoff's Current Law (KCL) and Kirchoff's Voltage Law (KVL) may be used to calculate voltage for each upstream bus of a line or transformer branch. After performing such a backward sweep, a voltage mismatch at the low side (LS) bus of the substation 12 may be calculated. If the voltage mismatch is greater than some tolerance, a forward sweep may be performed. In the forward sweep, Kirchoff's Voltage Law (KVL) may be used to compute the voltage for each downstream bus of the feeder 14, by using the specified source voltage, $V_S$, and the line currents determined in the previous backward sweep. This iterative process may continue until the error in the magnitude of the substation 12 voltage $V_S$ is within the tolerance.

Figure 31:
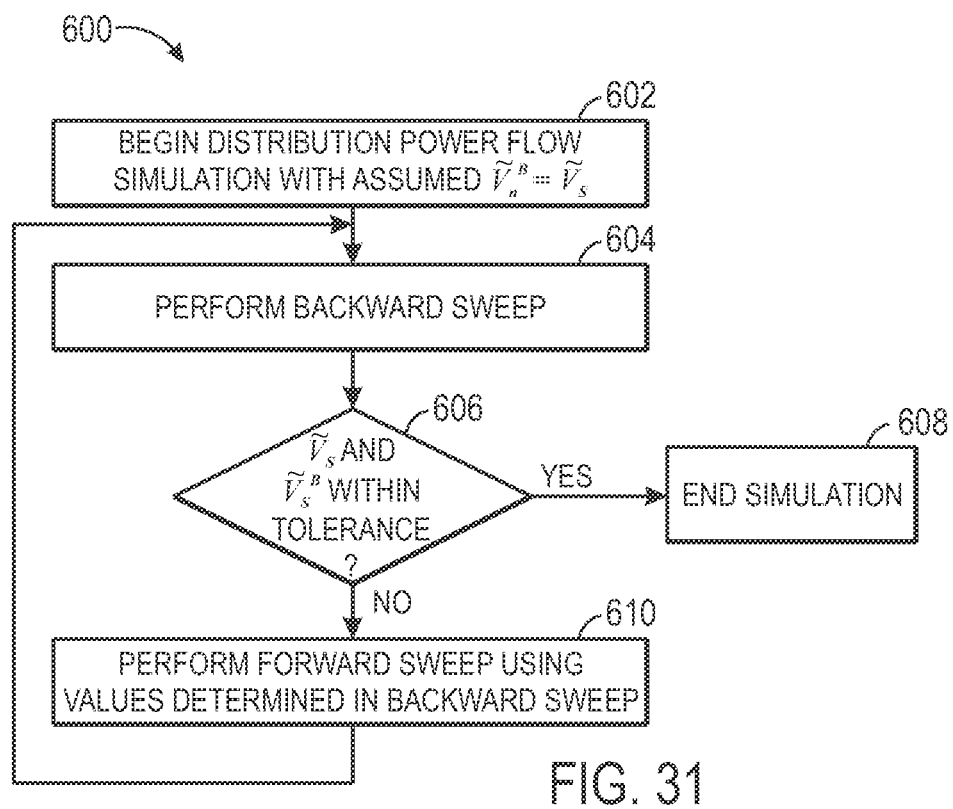
FIG. 31 is a flowchart describing an embodiment of a method for performing a distribution power flow simulation of a feeder of an electrical distribution system.

Determining the distribution power flow for a feeder 14 without laterals may occur as illustrated by a flowchart 600 of FIG. 31. The flowchart 600 may begin when the application platform for Volt/Var optimization 18 sorts buses of the feeder 14 according to their distance to the substation 12 and initializes the end node voltage as $\tilde{V}_n^B = \tilde{V}_S$, where $\tilde{V}_S$ is the specified voltage at the substation bus LS and the superscript "B" stands for "backward sweep" (block 602). The application platform for Volt/Var optimization 18 may start from the end bus and perform a backward sweep using KCL and KVL to calculate voltage of each upstream bus and the line currents (block 604). The backward sweep may take place as follows: Calculate the load current at the end node, n, as:

$$\tilde{I}_n^B = \left(\frac{S_n^B}{\tilde{V}_n^B}\right)^*,$$

where $S_n^B = P_n^B + jQ_n^B$ is complex power at node n.
Apply KCL to calculate the current flowing from node n to n−1:

$$\tilde{I}_{n-1,n}^B = \tilde{I}_n^B.$$

Compute the voltage at node n−1 as:

$$\tilde{V}_{n-1}^B = \tilde{V}_n^B + \tilde{Z}_n \tilde{I}_{n-1,n}^B.$$

Calculate the load current at the node, n−1 as:

$$\tilde{I}_{n-1}^B = \left(\frac{S_{n-1}^B}{\tilde{V}_{n-1}^B}\right)^*.$$

Compute the current flowing from node n−2 to node n−1 as:

$$\tilde{I}_{n-2,n-1}^B = \tilde{I}_{n-1}^B + \tilde{I}_{n-1,n}^B.$$

Compute the voltage at node n−2:

$$\tilde{V}_{n-2}^B = \tilde{V}_{n-1}^B + \tilde{Z}_{n-1}\tilde{I}_{n-2,n-1}^B.$$

The procedure continues until the substation voltage is calculated.

$$\tilde{V}_S^B = \tilde{V}_1^B + \tilde{Z}_1 \tilde{I}_t^B,$$

where:

$$\tilde{I}_t^B = \sum_{i=1}^{n} \tilde{I}_i^B.$$

The application platform for Volt/Var optimization 18 then may detect whether the difference between the specified and calculated voltages, $\tilde{V}_S$ and $\tilde{V}_S^B$ at the substation is less than the convergence tolerance, ϵ (decision block 606):

$$\|\tilde{V}_S| - |\tilde{V}_S^B\| < \epsilon.$$

If the above relationship is true, the simulation may be understood to be reasonably accurate and the application platform for Volt/Var optimization 18 may end its distribution power flow simulation (block 608). Otherwise, the application platform for Volt/Var optimization 18 may perform a forward sweep using the specified source voltage, $\tilde{V}_S$, and the currents calculated in the backward sweep of block 604 (block 610). The forward sweep of block 610 may be carried out, for example, as follows:
A new voltage at node 1 is computed:

$$\tilde{V}_1^F = \tilde{V}_S - \tilde{Z}_1 \tilde{I}_t^B,$$

where superscript "F" stands for "forward sweep."
The forward sweep may continue at each node i until new voltages at all end nodes have been computed:

$$\tilde{V}_i^F = \tilde{V}_{i-1}^F - \tilde{Z}_i \left(\tilde{I}_t^B - \sum_{j=1}^{i-1} \tilde{I}_j^B\right).$$

After completing the forward sweep of block 610, the backward sweep may be repeated (block 604) using the new end voltages (i.e., $\tilde{V}_n^B = \tilde{V}_n^F$) rather than the assumed voltage $\tilde{V}_S$ as carried out in the first iteration of the backward sweep.

The forward and backward sweeps of blocks 604 and 610 may be repeated as shown in the flowchart 600 until the calculated voltage at the source is within the tolerance ϵ of the specified source voltage $\tilde{V}_S$.

If the feeder 14 has laterals, the specified voltage at the substation bus, $\tilde{V}_S$, may be used as the initial voltage at the end nodes. The number of end nodes is equal to the number of the laterals of the feeder 14. The application platform for Volt/Var optimization 18 may start at the furthest node, which may be on the main feeder 14 or on a lateral, and continue with a backward sweep until a first "junction" node (i.e., a node where the lateral branches in two directions) has been reached. At this point, the application platform for Volt/Var optimization 18 may "jump" to the end node of the branches connected to this junction node, and may use the backward sweep until it reaches the junction node again. After the backward sweep has been performed on all branches, the number of the calculated voltages for this junction point may be understood to be equal to the number of the branches connected to the junction. The upstream bus voltage of the junction bus then may be calculated using the most recent calculated junction bus voltage and the calculated branch current between the two nodes.

The manners of performing the distribution power flow simulation described above may involve assuming that before the power flow analysis of a distribution system, the three-phase voltages at the substation 12 and the complex power at all of the loads 27, or load models, are known. However, if metering points are present along the feeder 14, it may desirable to force the computed values to match the metered input.

For example, the input complex power (kW and kVAr) to a feeder 14 may be known from the measurements 48 arriving at the application platform for Volt/Var optimization 18 at the substation 12. This metered data in the measurements 48 may represent, for example, total three-phase power or power for each individual phase. If the input complex power to the feeder 14 computed using the iterative distribution power flow process described above does not match the measurements 48, the ratio of the measurements 48 to the computed input may be calculated, and loads 27 multiplied by this ratio. A few iterations of this iterative distribution power flow process may be used to determine a new computed input to the feeder 14. This new computed input should be closer to the metered input indicated by the measurements 48.

In general, when the application platform for Volt/Var optimization 18 simulates the distribution power flow across various segments of the electrical distribution system, the application platform for Volt/Var optimization 18 may follow the following process. First, the application platform for Volt/Var optimization 18 may calculate a ratio of the metered input from the measurements 48 and the input computed in the distribution power flow process discussed above. Second, the application platform for Volt/Var optimization 18 may carry out the iterative distribution power flow process discussed above again, repeating until the computed input falls within a tolerance of the metered input indicated by the measurements 48.

Figure 9:
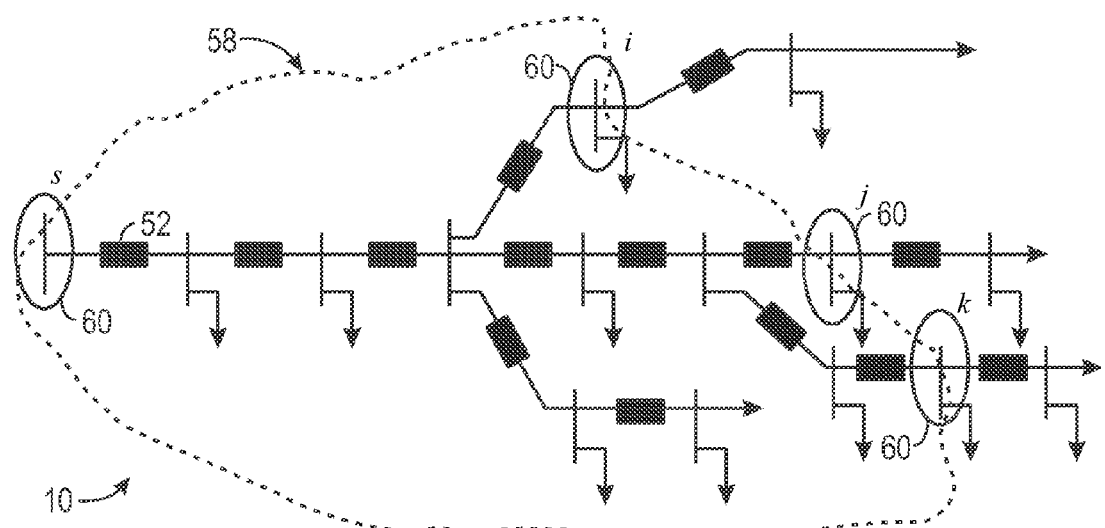
FIGS. 9-11 are schematic diagrams of measurement zones of a segment of an electrical distribution system, in accordance with an embodiment.
Figure 10:
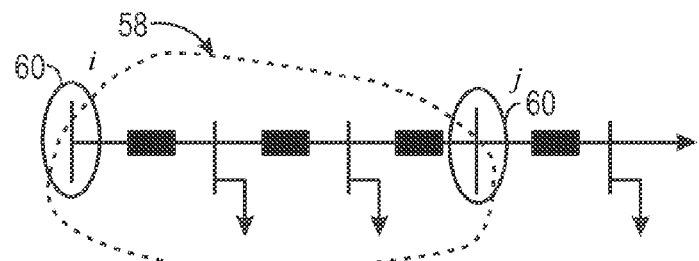
Figure 11:
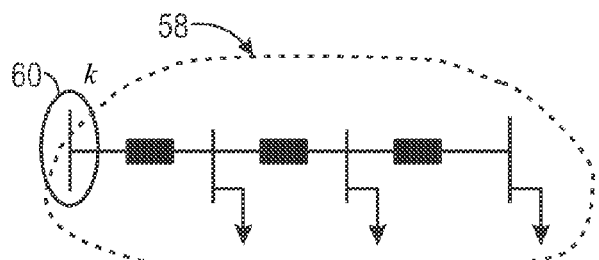

A similar process may be performed when the measurements 48 indicate metered data for other points on the feeder 14. For example, as shown by FIGS. 9-11, a distribution feeder 14 may be divided into measurement zones 58 that are bounded by end point measurements 60. These end point measurements 60 may provide, for example, accurate branch active and reactive power flow measurements, voltage magnitude, and/or phasor measurements. It should be appreciated that the end point measurements 60 may be treated as boundary constraints, and that the measurement zones 58 may contain additional measurements within. Voltage magnitudes and voltage phase angles may be treated as specified voltages at measurement buses on the feeder 14. Calculated loads 27 in each measurement zone 58 may be adjusted separately to meet boundary constraints indicated by the end point measurements 60. Note that when an end point measurement 60, providing kW and kVAr, is present on the feeder 14, only calculated loads 27 downstream from the end point measurement 60 may be modified. The distribution power flow simulation across a feeder 14 may be used to compute voltage rise $\Delta V$, active power loss reduction $\Delta P_{LOSS}$, and a new power factor that may occur when each of the distribution capacitor banks 22 of the feeder 14 is switched on or off.

Figure 12:
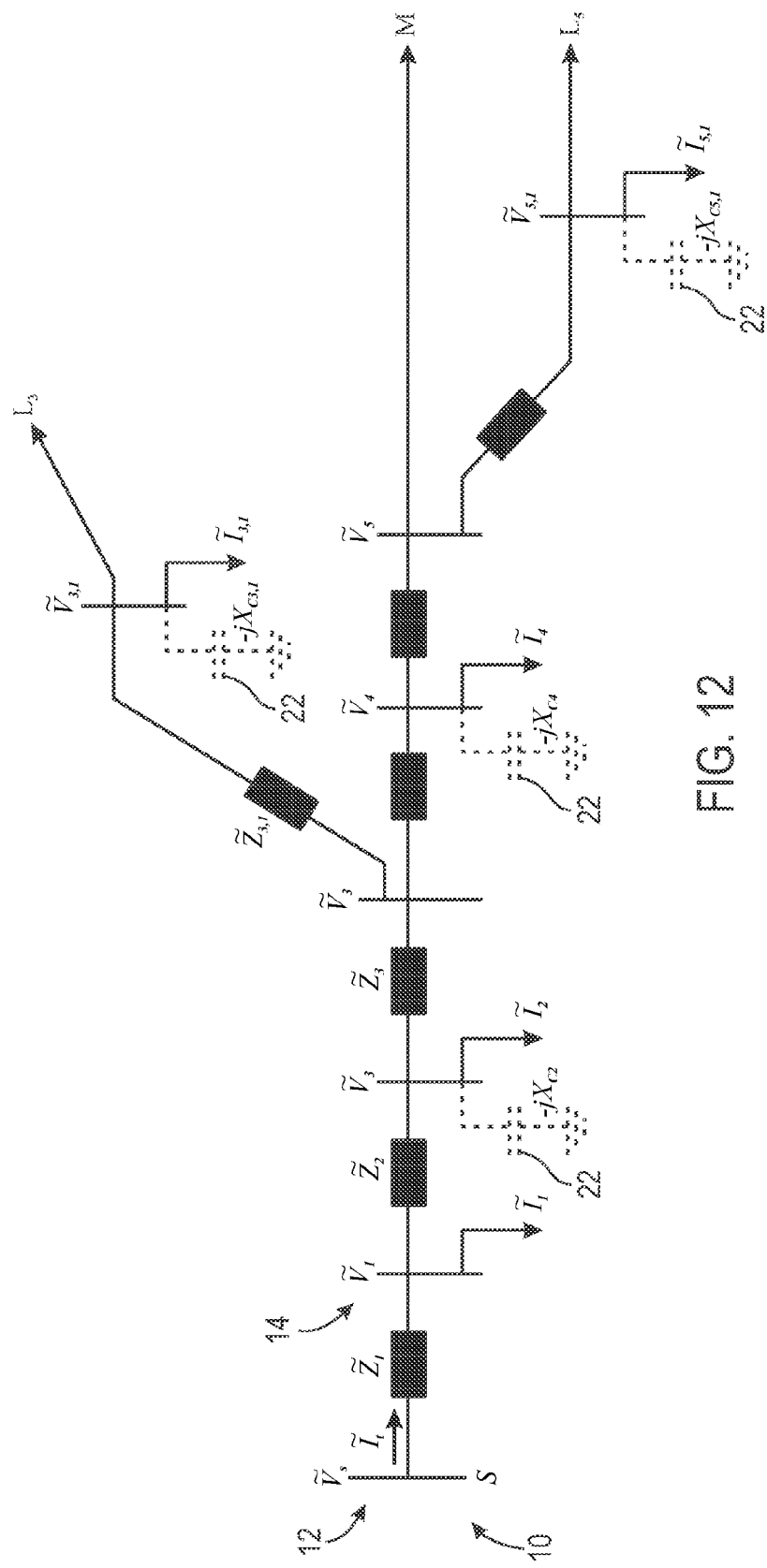
FIG. 12 is a schematic diagram representing a manner of switching distribution capacitor banks to vary a desired operational parameter of a segment of an electrical distribution system, in accordance with an embodiment.

The active power loss reduction $\Delta P_{LOSS}$ due to the switching on of a capacitor 22 may be approximated as the sum of the reductions in the active power losses in each line segment on the path from that capacitor 22 to the substation 12 bus (for the moment we will neglect the losses in distribution transformer). For example, as shown in FIG. 12, when a capacitor C2 is switched on, the reduction and active power losses may be represented by the following equation:

$$\Delta P_{LOSS_{C_2}} = \Delta P_{loss_{C_2}}^{S,1} + \Delta P_{loss_{C_2}}^{1,2},$$

where $\Delta P_{loss_{C_2}}^{i,j} \approx R_{i,j} I_{X_{i,j}}^2 - R_{i,j}(I_{X_{i,j}} - I_{C_2})^2$ represents loss reduction in line segment between nodes i and j due to capacitor $C_2$, the value $R_{i,j}$ is resistance of the line segment between nodes i and j, and the value $I_{X_{i,j}} = \text{Im}(\tilde{I}_{i,j})$ is the imaginary component of the current $\tilde{I}_{i,j}$ flowing between nodes i and j.

The reduction in the active power losses $\Delta P_{LOSS}$ loss due to the addition of other capacitors 22 of the feeder 14 may be calculated in a similar way, as follows:

$$\Delta P_{LOSS_{C_4}} = \Delta P_{loss_{C_4}}^{S,1} + \Delta P_{loss_{C_4}}^{1,2} + \Delta P_{loss_{C_4}}^{2,3} + \Delta P_{loss_{C_4}}^{3,4}$$

$$\Delta P_{LOSS_{C_{3,1}}} = \Delta P_{loss_{C_{3,1}}}^{S,1} + \Delta P_{loss_{C_{3,1}}}^{1,2} + \Delta P_{loss_{C_{3,1}}}^{2,3} + \Delta P_{loss_{C_{3,1}}}^{3,31}$$

$$\Delta P_{LOSS_{C_{5,1}}} = \Delta P_{loss_{C_{5,1}}}^{S,1} + \Delta P_{loss_{C_{5,1}}}^{1,2} + \Delta P_{loss_{C_{5,1}}}^{2,3} + \Delta P_{loss_{C_{5,1}}}^{3,4} + \Delta P_{loss_{C_{5,1}}}^{4,5} + \Delta P_{loss_{C_{5,1}}}^{5,51}$$

The power factor may also be impacted by switching on the capacitors 22 of the feeder 14. For example, the effect of switching on the capacitor C2 of FIG. 12 on the power factor at the substation 12 low side (LS) bus S may be given as follows:

$$pf_{C_2} \approx \frac{P_t - \Delta P_{LOSS_{C_2}}}{\sqrt{(P_t - \Delta P_{LOSS_{C_2}})^2 + (Q_t - \Delta Q_{LOSS_{C_2}} - Q_{C_2})^2}}, \text{ where}$$

$$\Delta Q_{LOSS_{C_2}} = \Delta Q_{loss_{C_2}}^{S,1} + \Delta Q_{loss_{C_2}}^{1,2}.$$

Selection of the Operational Parameter to Optimize

Figure 13:
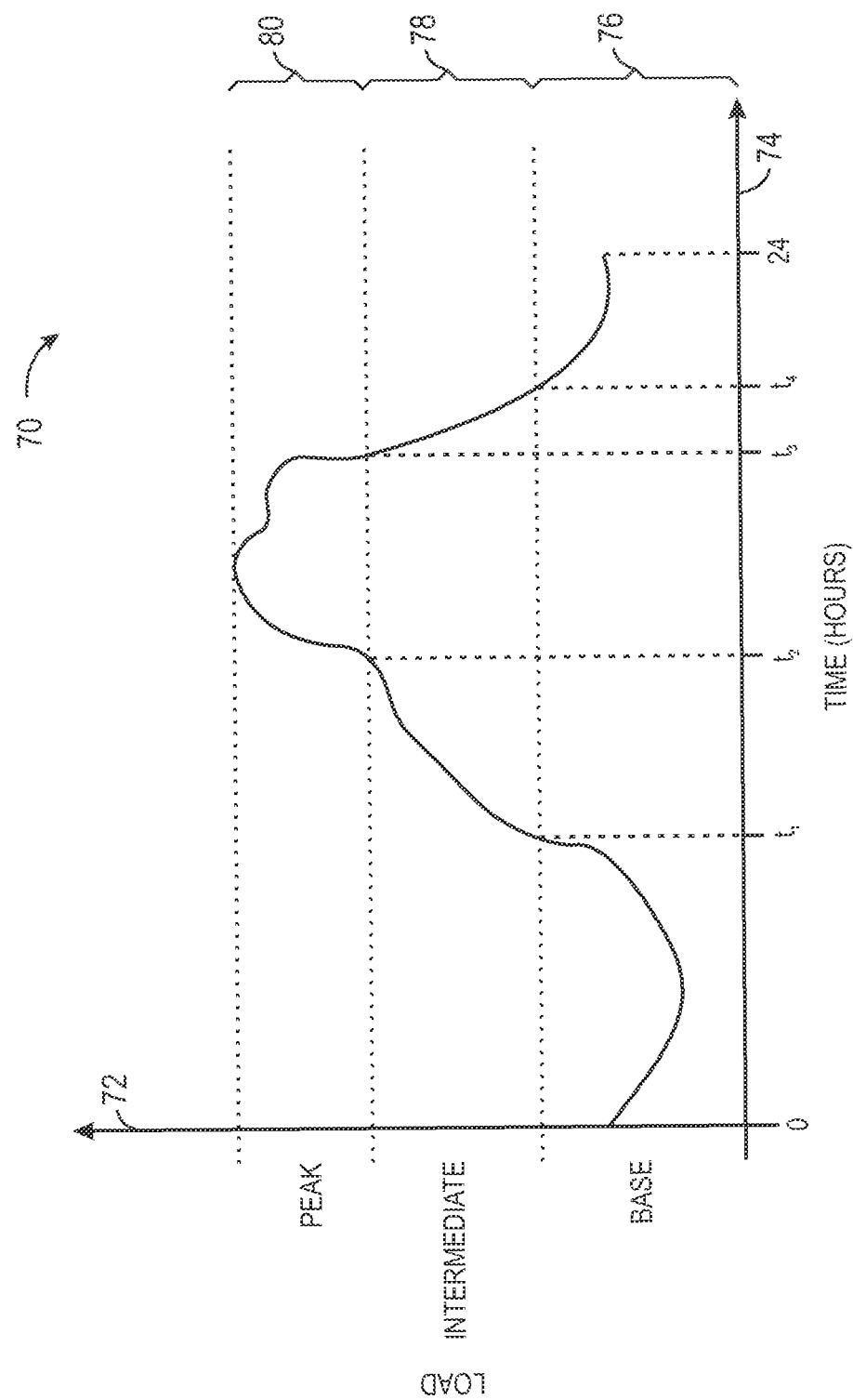
FIG. 13 is a plot representing a change in load across a segment of an electrical distribution system over time, in accordance with an embodiment.
Figure 14:
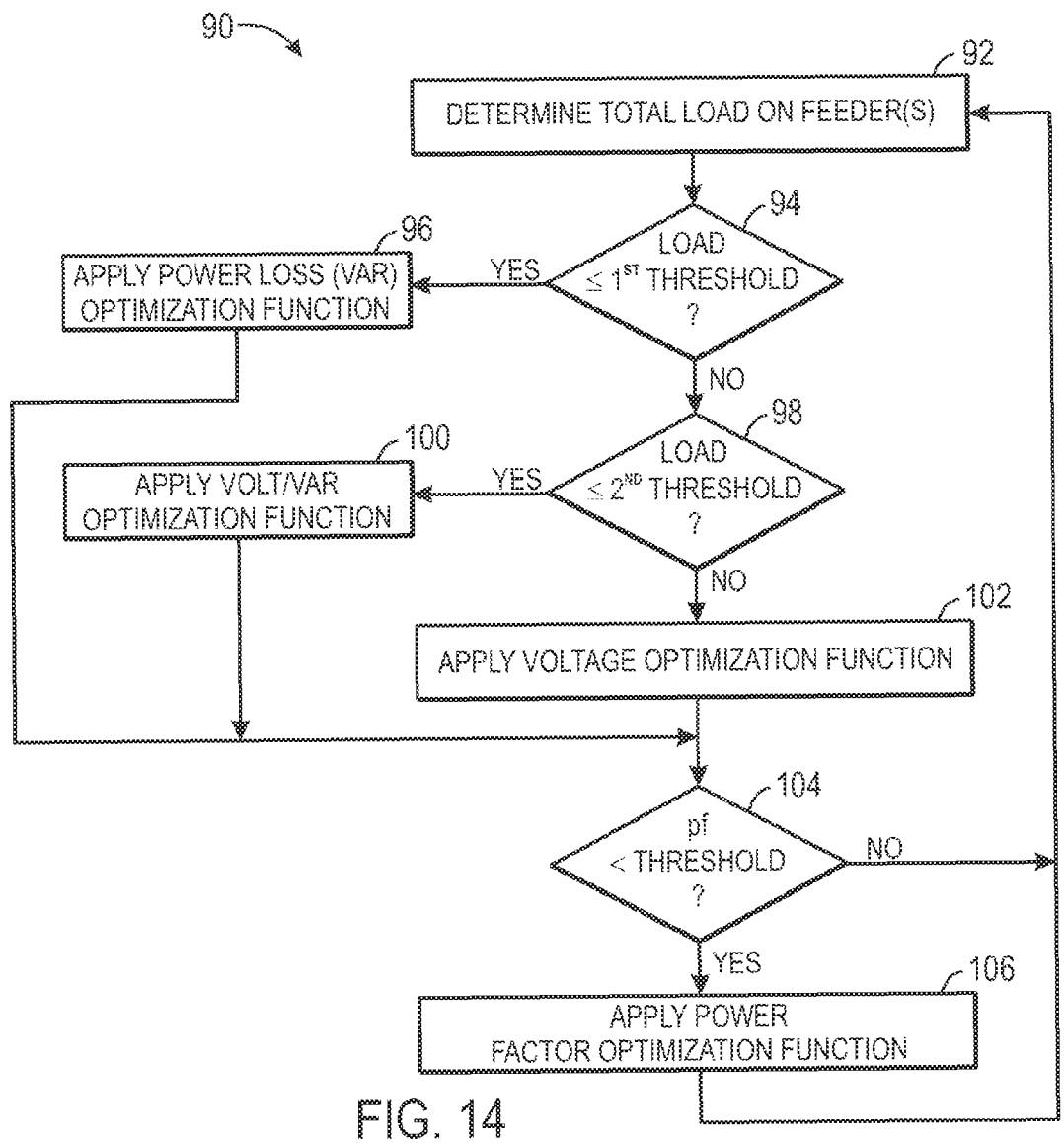
FIGS. 14 and 15 are flowcharts describing embodiments of methods for selecting and applying various decentralized coordinated control schemes to optimize a desired operational parameter of an electrical distribution system, in accordance with an embodiment.

The total load on a feeder 14 may vary over time, impacting the amount of real and reactive power drawn across the feeder 14. As more power is drawn by the loads 26 of the feeder 14, more power may be generated by various electrical generation facilities. The amount of power drawn by the loads 26 on the feeder 14 may vary predictably over time. One example of this variation appears in a plot 70 of FIG. 13, in which the power demand across a feeder 14 varies over the period of one day. In the plot 70, an ordinate 72 represents the total load demand in units of kW from the loads 26 on a feeder 14, and an abscissa 74 represents time in units of hours over a 24-hour period.

As can be seen in the plot 70, the total load demand by the loads 26 on a feeder 14 may be relatively low at certain parts of the day, namely at night, when residential and commercial loads are usually relatively low. These nighttime hours may be represented by time segments 0-$t_1$ and $t_4$-24. During these hours, substantially only baseload generation 76 facilities may be generating power. The cost of power generated using baseload generation 76 facilities may be relatively low (e.g., $0.05-$0.06/kWh), as baseload power generation 76 facilities provide some power at all times. At other times, such as between time segments $t_1$-$t_2$ and $t_3$-$t_4$, intermediate load generation 78 facilities may provide additional power in combination with the baseload generation 76 facilities. Intermediate load generation 78 facilities may be more costly to supply power than the baseload generation 76 facilities, but may be used less often. Finally, during relatively short periods of particularly high demand, the total load demand by the loads 26 of the feeder 14 may reach peak 80 levels. During the peak load generation 80, illustrated in FIG. 13 as occurring between time segments $t_2$-$t_3$, the baseload power generation 76 facilities, the intermediate power generation 78 facilities, and peak load generation 80 facilities may supply power. The cost of supplying additional power via the peak load generation 80 facilities may be quite high (e.g., $150/kWh). The peak load generation 80 conditions may last for a relatively short period of time, sometimes occurring only a few hours per year.

Because the quantity and quality of the loads 26 of the feeder 14 may vary over time, the supervisory station controller 38 may optimize different operational parameters of the feeder 14 as these power demand conditions change. For example, the supervisory station controller 38 may optimize the voltage output across the feeder 14 during peak load generation 80 conditions (e.g., between time segments $t_2$-$t_3$) using a "Voltage optimization function." As will be discussed below, this voltage optimization function may involve both voltage flattening across the feeders 14 and a voltage reduction across the feeders 14, such that the voltage across the feeders 14 may be reduced while remaining within the prescribed minimum and maximum boundaries. In particular, on the consumer side, all loads 26 may be built to operate within a certain voltage range. For example, according to current standards, each phase voltage on the customer side should be within the range of 120V plus or minus 5% or, equivalently, 114V-126V. Many electrical devices may operate more efficiently and use less power at a lower voltage (assuming a constant impedance load, constant current load and so forth). In other words, during the peak load generation 80 hours (e.g., between times $t_2$-$t_3$), a lower voltage can result in significant demand reduction and energy conservation. Operating at a lower voltage may also extend appliance life. Examples of carrying out the voltage optimization function are described below.

During baseload generation 76 conditions (e.g., between time segments 0-$t_1$ and $t_4$-24 of the plot 70, and typically occurring at night), a reduction in voltage to force a reduction in demand may be less desirable than reducing active power losses. As such, during such a time when substantially only baseload 76 generation facilities are employed, the supervisory station controller 38 may undertake an "active power loss reduction function," also referred to as a "VAR optimization function," to optimize the active power losses of the feeders 14. The active power loss reduction function may considerably improve the efficiency of the feeders 14 of an electrical distribution system 10, since active power losses from generation to distribution to a customer can reach 75% or more. Specifically, because line active power losses depend on the resistance of the line and the magnitude of the current, reducing the current across the feeders 14 may lead to an overall active power loss reduction. The supervisory station controller 38 may carry out the active power loss reduction function, for example, as discussed below.

During intermediate load generation 78 conditions (e.g., between time segments $t_1$-$t_2$ and $t_3$-$t_4$) a combination of a reduction in voltage and a reduction in power losses throughout the feeders 14 may be warranted. Accordingly, during intermediate load generation 78 conditions, the supervisory station controller 38 may apply a "Volt/VAR optimization function" that balances these operational parameters. In particular, it is noted that voltage flattening and VAR optimization may be competing objectives. Achieving the lowest possible voltage profile with the smallest voltage deviation $\Delta V$ may come at the expense of higher active power losses. Likewise, achieving the smallest power losses may come at the expense of a greater voltage deviation $\Delta V$ across the feeders 14. As such, a balance between the voltage and VAR optimization according to the Volt-VAR function may attempt to balance these concerns during intermediate load generation 78 conditions. Examples of carrying out the Volt-VAR optimization function are discussed below.

If, at any time, the power factor of a feeder 14 is excessively undesirable (e.g., falling beneath some threshold), the supervisory station controller 38 may perform a "power factor optimization function" to improve the power factor. The supervisory station controller 38 may seek to optimize the power factor at the substation 12 and/or the feeders 14. Examples for carrying out the power factor optimization function are discussed below.

Before continuing further, various objective functions (i.e., operational parameter targets sought by the supervisory station controller 38) respectively associated with the voltage optimization function, the active power loss reduction function, the Volt-VAR optimization function, and the power factor optimization function are presented below.

Voltage Optimization Objective Function

As will be discussed below, the application platform for Volt/VAR optimization 18 may optimize the voltage across the feeders 14 first by flattening the voltage and then by reducing it. The application platform for Volt/VAR optimization 18 may attempt to flatten the voltage profile along the feeders 14 and enable the feeders 14 to use deeper voltage reduction modes by minimizing the voltage deviations $\Delta V$ according to the following objective:

$$\text{Min } \Delta V$$

subject to $$V_{min} \leq V_j \leq V_{max}, j = 1, \ldots, N$$

$$pf_{min} \leq pf \leq pf_{max}$$

In the equation above, $\Delta V$ is the difference between the maximum and the minimum voltage on the feeder 14, N is the total number of feeder 14 voltage measurement points, $V_{min}$ is the minimum allowable voltage on the feeder 14 (e.g., 120V−5%, or 114V), $V_{max}$ is the maximum allowable voltage on the feeder 14 as defined in the voltage flattening (VF) function (e.g., 120V+5%, or 126V), pf is the power factor measured at the head of the feeder 14, and $pf_{min}$ and $pf_{max}$ are its lower and upper permissible limits as desired. As will be described further below, the application platform for Volt/VAR optimization 18 may determine which capacitor 22 or combinations of capacitors 22 may satisfy the above relationship. Once the application platform for Volt/VAR optimization 18 has caused the voltage deviation $\Delta V$ across the feeders 14 to be reduced, the application platform for Volt/VAR optimization 18 may cause the source voltage $V_S$ at the outset of the feeders 14 to be reduced.

Active Power Loss Reduction Objective Function

The application platform for Volt/Var optimization 18 may optimize the active power losses across the feeders 14 using the active power loss reduction function. This active power loss reduction function may involve seeking the objective described by the following objective:

$$\text{Max } \Delta P_{loss}$$

subject to $$V_{min} \leq V_j \leq V_{max}, j = 1, \ldots, N$$

$$pf_{min} \leq pf \leq pf_{max}$$

where is $\Delta P_{loss}$ is active power loss reduction on the feeder 14, N is the total number of feeder 14 voltage measurement points, $V_{min}$ is the minimum allowable voltage on the feeder 14 (e.g., 120V−5%, or 114V), $V_{max}$ is the maximum allowable voltages on the feeder 14 as defined in the active power loss reduction function as desired (e.g., 120V+5%, or 126V), pf is the power factor measured at the head of the feeder 14, while $pf_{min}$ and $pf_{max}$ are its lower and upper permissible limits as desired.

Volt-VAR Optimization Objective Function

Carrying out the Volt-VAR optimization function may involve competing objectives, namely, voltage flattening and VAR optimization. Achieving the lowest possible voltage profile with the smallest voltage deviation $\Delta V$ may come at the expense of higher active power losses. Likewise, achieving the smallest power losses may come at the expense of having a greater voltage deviation $\Delta V$ across the feeders 14. As such, a balance between the voltage and VAR optimization according to the Volt-VAR function may be determined according to the following relationships:

$$\text{Max } \Delta P_{loss} \text{ and Min } \Delta V$$

subject to $$V_{min} \leq V_j \leq V_{max}, j = 1, \ldots, N$$

$$pf_{min} \leq pf \leq pf_{max}$$

In the equation above, the objective is to simultaneously minimize voltage deviation $\Delta V$ on the feeder 14, and maximize active power loss reduction $\Delta P_{loss}$ on the feeder 14. N is the total number of feeder 14 voltage measurement points, $V_{min}$ is the minimum allowable voltage on the feeder 14 (e.g., 120V−5%, or 114V), $V_{max}$ is the maximum allowable voltage on the feeder 14 as defined in the Volt-VAR optimization function (e.g., 120V+5%, or 126V), pf is the power factor measured at the head of the feeder 14, and $pf_{min}$ and $pf_{max}$ are lower and upper permissible limits for power factor as desired. Since Min $\Delta V$ and Max $\Delta P_{loss}$ are two competing objectives, there will be no single optimal solution. Instead, the optimization will result in a number of solutions that represent trade-offs between the two objectives. Finding an appropriate trade-off between voltage deviation on the feeder $\Delta V$ and loss reduction $\Delta P_{loss}$ will be described in greater detail below with reference to FIGS. 23 and 24.

Power Factor Optimization Objective Function

The application platform for Volt/Var optimization 18 may perform a power factor optimization function to control the equipment of the feeders 14 to improve the power factor. The application platform for Volt/Var optimization 18 generally may attempt to optimize the power factor according to the following objective:

$$\text{Min}|pf - pf_{des}|$$

subject to $$V_{min} \leq V_j \leq V_{max\,pf},\, j = 1, \ldots, N$$

$$pf_{min} \leq pf \leq pf_{max}$$

where $pf_{des}$ is desired power factor, N is the total number of feeder 14 voltage measurement points, $V_{min}$ is the minimum allowable voltage on the feeder 14 (e.g., 120V−5%, or 114V), $V_{maxpf}$ is the maximum allowable voltage on the feeder 14 as defined in the power factor optimization function (e.g., 120V+5%, or 126V) as desired, pf is the power factor measured at the head of the feeder 14, and $pf_{min}$ and $pf_{max}$ are its lower and upper permissible limits as desired.

Optimization Function for a Desired Operational Parameter

Figure 16:
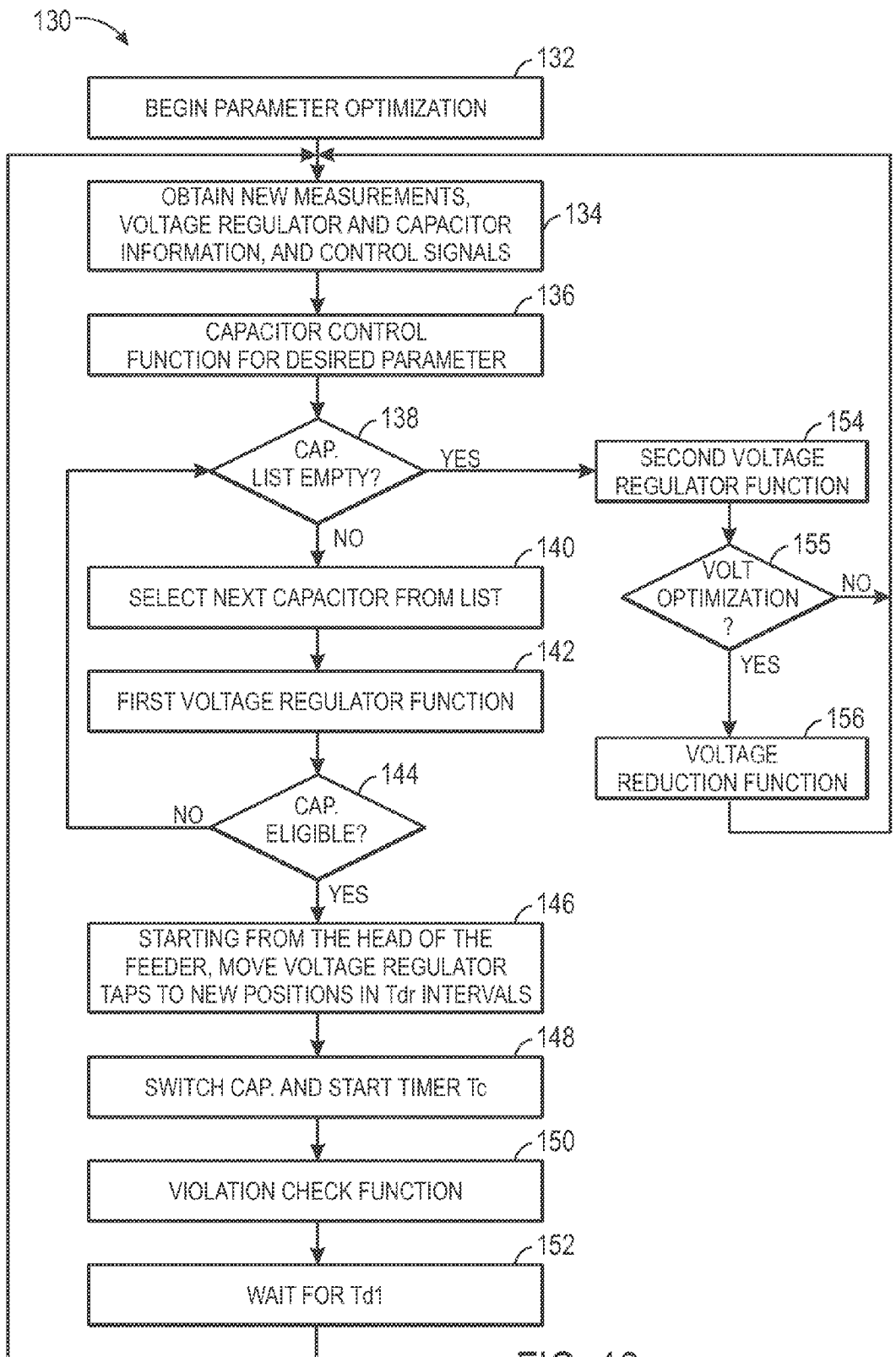
FIG. 16 is a flowchart describing an embodiment of a method for decentralized coordinated control of an electrical distribution system to optimize a desired operational parameter, in accordance with an embodiment.

When a feeder 14 has a normal configuration (i.e., no anomalous conditions on the feeder 14 or restored feeder 14 segments feed from the normally configured source feeder 14), the application platform for Volt/Var optimization 18 may carry out an optimization function for a desired operational parameter, such as power factor optimization, active power loss reduction optimization, voltage optimization, and/or Volt/VAR optimization, in the manner represented by a flowchart 130 of FIG. 16. The flowchart 130 may begin as the application platform for Volt/Var optimization 18 starts the desired parameter optimization function (block 132). As such, the application platform for Volt/Var optimization 18 may obtain measurements 48, which may include LTC transformer 16, voltage regulator (VR) 28, and capacitor 22 status and voltage information directly from remote terminal units (RTUs), from a database 49 that contains such data, or from the field (block 134).

Having obtained the measurements 48, the application platform for Volt/Var optimization 18 may carry out a capacitor control function that optimizes the desired parameter (block 136). This capacitor control function will be discussed in greater detail below with reference to FIGS. 21 and 22 below. Essentially, the capacitor control function of block 136 may return a combination of capacitors 22 or a single capacitor 22 that, when switched on or off, may optimize the desired parameter of the feeder 14. As will be discussed below, the capacitor control function may involve simulating the feeder 14 in various configurations to determine a configuration that best matches the objective relationship presented above associated with optimizing the desired parameter.

If the capacitor control function block 136 outputs a capacitor-switching configuration that switches on or off at least one capacitor 22 in the feeder 14 (decision block 138), the application platform for Volt/Var optimization 18 may simulate the effects of these capacitor-switching configurations via distribution power flow simulations or by using the approximate equations. Thus, as will be discussed below, selecting from the next capacitor 22 that is available for switching in the capacitor-switching configuration (block 140), the application platform for Volt/Var optimization 18 may perform a first voltage regulator function (block 142). An example of such a first voltage regulator function 142 is discussed in greater detail below with reference to FIG. 25. Essentially, the first voltage regulator function of block 142 involves simulating the effect on the feeder 14 of switching on or off the selected capacitor 22 to ensure that no voltage violations are expected to result. If the first voltage regulator function of block 142 indicates that the selected capacitor 22 is expected to produce a voltage violation (decision block 144), it will calculate tap point and the application platform for Volt/Var optimization 18 may issue control signals 50 to the equipment of the feeder 14 to enact the determined configurations.

In particular, the application platform for Volt/Var optimization 18 may first move taps of voltage regulators (VRs) 28 to new positions, as may have been calculated during the first voltage regulator function (block 142), starting from the head of the feeder 14 (block 146). The application platform for Volt/Var optimization 18 may continue to move taps of the voltage regulators (VRs) 28 $T_{dr}$ intervals, which may last, for example, approximately 10 s to 15 s. Next, the application platform for Volt/Var optimization 18 may cause the selected capacitor 22 to be switched on or off and may start a timer of duration $T_c$ (block 148). The duration $T_c$ represents a capacitor switching time delay, during which time the selected capacitor 22 will not be considered available for switching. In some embodiments, $T_c$ may last at least 5 minutes. Additionally or alternatively, Tc may become progressively longer as the number of times the capacitor 22 has been switched increases. For example, once the capacitor 22 has been switched on or off five times in a particular 24-hour period, the time Tc may be set such that the capacitor 22 can no longer be switched for some extended duration (e.g., 24 more hours). The timer Tc may be a user-defined value. For instance, the there may be two timers that can be set from 0 s to any suitable desired value—a capacitor 22 may be allowed to be switched ON after a timer Tc expires and may be allowed to be switched OFF after another timer Td has expired.

To ensure that the simulations performed by the application platform for Volt/Var optimization 18 accurately predicted the effect of switching on the selected capacitor 22 on the voltage of the feeder 14, the application platform for Volt/Var optimization 18 next may run a violation check function (block 150). The violation check function may involve monitoring the actual measurements 48 of the feeder 14 following the changes in configuration of the equipment on the feeder 14, and taking corrective measures, if appropriate. An example of such a violation check function as carried out at block 150 is described in greater detail below with reference to FIG. 24. The violation check function of block 150 may be carried out until a time delay Td1 has passed, in which $T_c \gg T_{d1}$. After the time delay Td1, the active power loss reduction optimization function may start again, with the application platform for Volt/Var optimization 18 obtaining new measurements at block 174.

Returning to decision block 144, if the first voltage regulator function 142 indicates that switching on the selected capacitor 22 would result in a voltage violation that could not be remedied by adjusting voltage regulator (VR) 28 taps, the process flow may return to decision block 138. If the capacitor-switching configuration includes other available capacitors 22, the application platform for Volt/Var optimization 18 may select the next capacitor from the list of capacitors 22 (block 140) and carry out the first voltage regulator function (block 142) again.

Returning to decision block 138, it should be appreciated that any time the list of available capacitors 22 from a capacitor-switching configuration of the capacitor control function of block 136 is empty, there are no capacitors 22 of the feeder 14 that can be switched on or off to optimize active power losses without causing a voltage violation (i.e., the capacitor list is empty). Under such conditions, the active power losses may be considered optimized and the application platform for Volt/Var optimization 18 may carry out a second voltage regulator function 154. The second voltage regulator function of block 154 may be used to flatten the overall voltage across the length of the feeder 14. An example of such a second voltage regulator function as carried out at block 154 is described in greater detail below with reference to FIG. 25. If the parameter being optimized is wholly or entirely voltage (e.g., the voltage optimization function or the Volt/VAR optimization function) (decision block 155), a voltage reduction function may be carried out (block 156). An example of the voltage reduction function as carried out in block 156 is described in greater detail below with reference to FIG. 28. The application platform for Volt/Var optimization 18 may thereafter continue to optimize active power loss reduction according to the flowchart 130.

Figure 17:
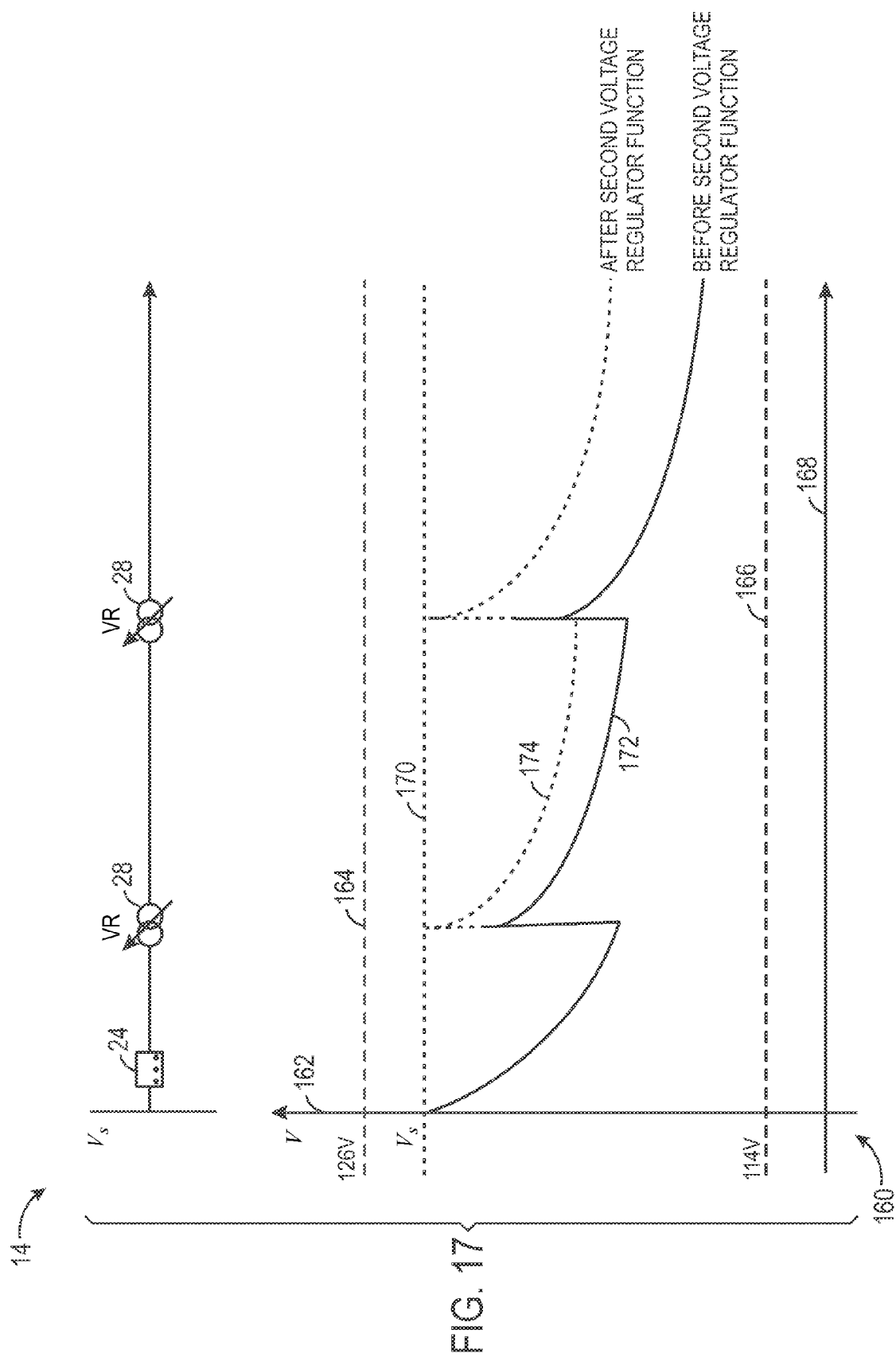
FIG. 17 is a plot modeling voltage over a segment of an electrical distribution system before and after adjusting voltage regulators in the method of the flowchart of FIG. 16, in accordance with an embodiment.

Before continuing further, the effect of carrying out the second voltage regulator function of block 154 of FIG. 16 is briefly described with reference to FIG. 17. Specifically, FIG. 17 illustrates a plot 160, which includes an ordinate 162 representing the voltage across the length of a feeder 14, as depicted above the plot 160. The voltages are delineated as falling within 120V±5%, or 126V (line 164) and 114V (line 166). An abscissa 168 represents a length of the feeder 14. As shown in FIG. 17, the feeder 14 includes two voltage regulators (VRs) 28. A curve 172 represents the voltage across the feeder 14 before the second voltage regulator function of block 154 of FIG. 16 is carried out, and a curve 174 illustrates the voltage across the length of the feeder 14 afterward. Thus, the second voltage regulator function of block 154 causes the voltage regulators (VRs) 28 to generally output the same supply voltage $V_S$ as provided at the outset of the feeder 14 on their respective high side (HS) buses.

Figure 15:
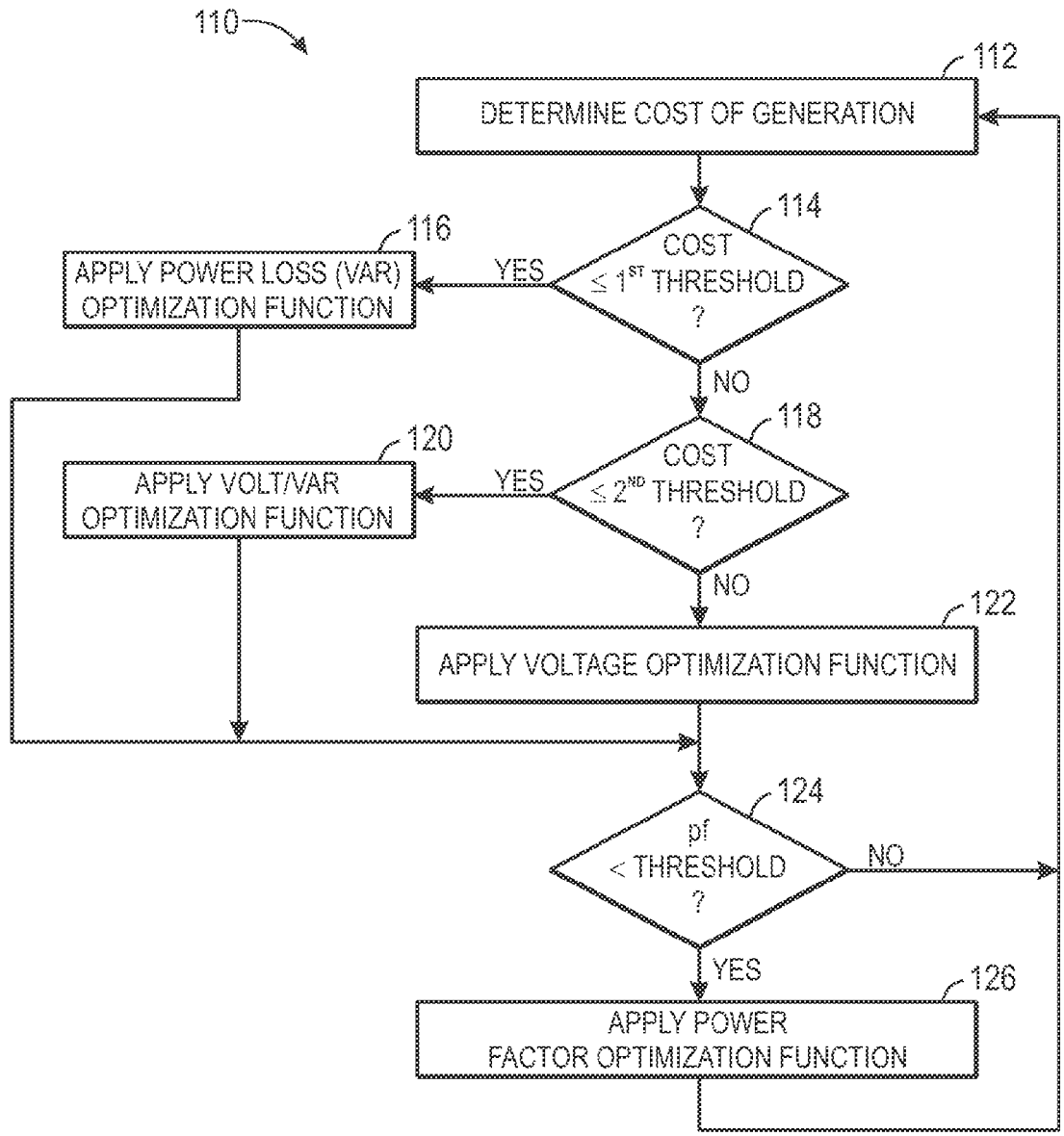
Figure 18:
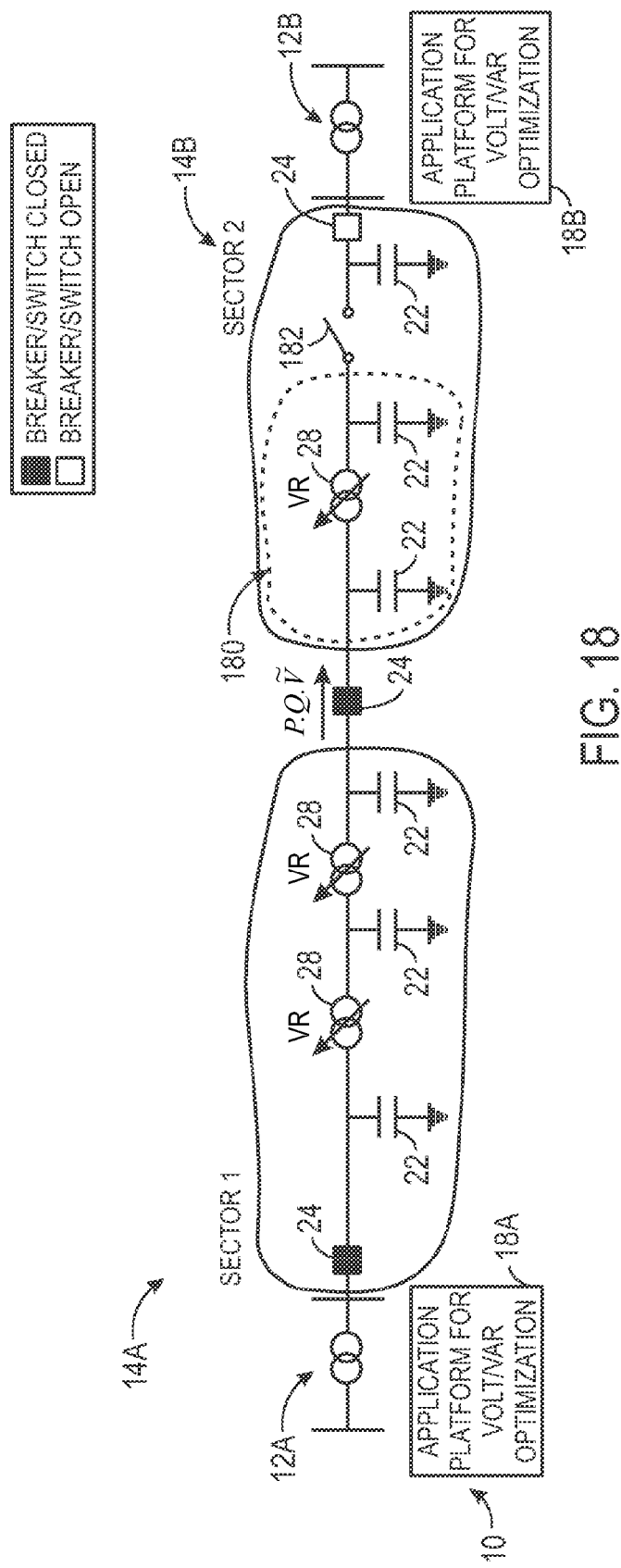
FIG. 18 is a one-line diagram illustrating a manner of supplying power from a first segment of an electrical distribution system to a restored segment of the electrical distribution system, in accordance with an embodiment.

The active power loss reduction optimization function of FIG. 16 may also be employed to optimize active power losses of a normally configured feeder and a restored segment of a different feeder 14 that had been subject to a fault. For example, as shown in FIG. 18, a first feeder 14A having power supplied by a first substation 12A may supply power to a restored segment 180 of a second feeder 14B that is usually supplied by a substation 12B. As seen in FIG. 18, a breaker 24 adjoining the first feeder 14A and the restored segment 180 of the second feeder 14B is illustrated as closed. Thus, it may be understood that the first feeder 14A is supplying power to the restored segment 180 of the second feeder 14B in FIG. 15. The breaker 24 and switch 124 on the other side of the restored segment 180 of the second feeder 14B are depicted as being open. A first application platform for Volt/Var optimization 18A may be associated with the first feeder 14A, and a second application platform for Volt/Var optimization 18B may be associated with the second feeder 14B.

Figure 19:
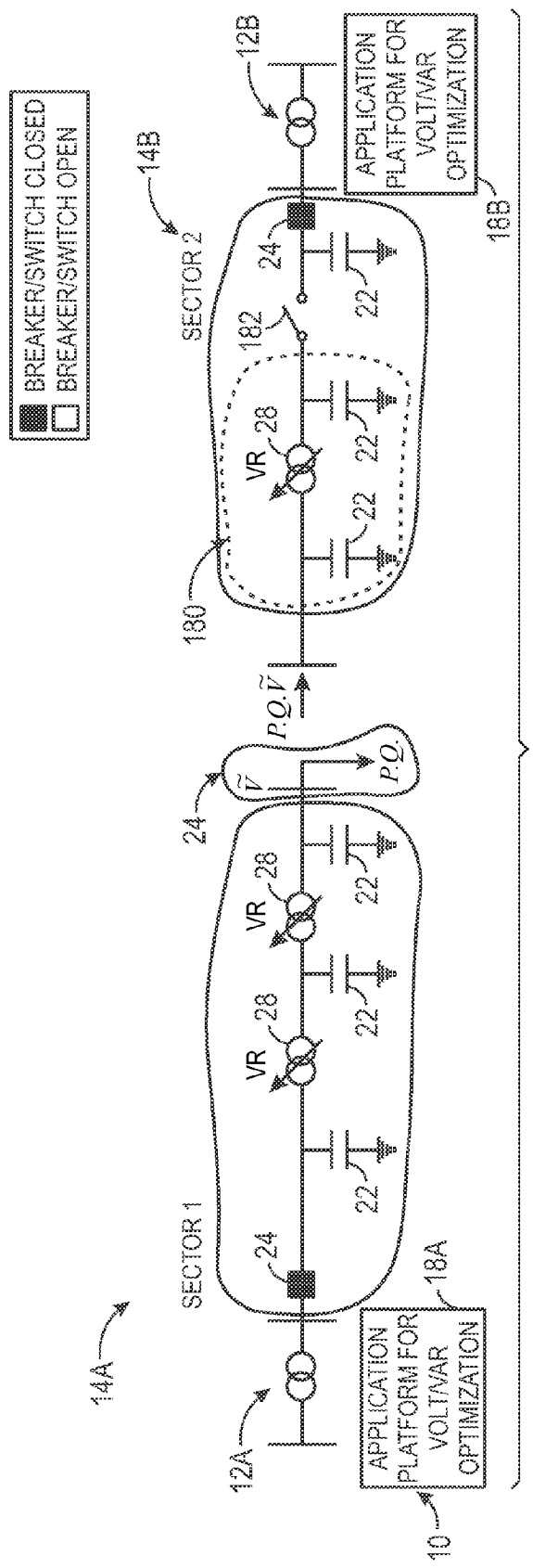
FIG. 19 is a one-line diagram representing an equivalent circuit of the one-line diagram of FIG. 18, in accordance with an embodiment.

FIG. 19 represents the circuit of FIG. 18 in equivalent form. Namely, from the perspective of the first feeder 14A, restored segment 180 of the second feeder 14B may be seen as a load 27. From the perspective of the restored segment 180 of the second feeder 14B, disconnect switch 124A is a source point that is supplying power to the restored segment 180.

Figure 20:
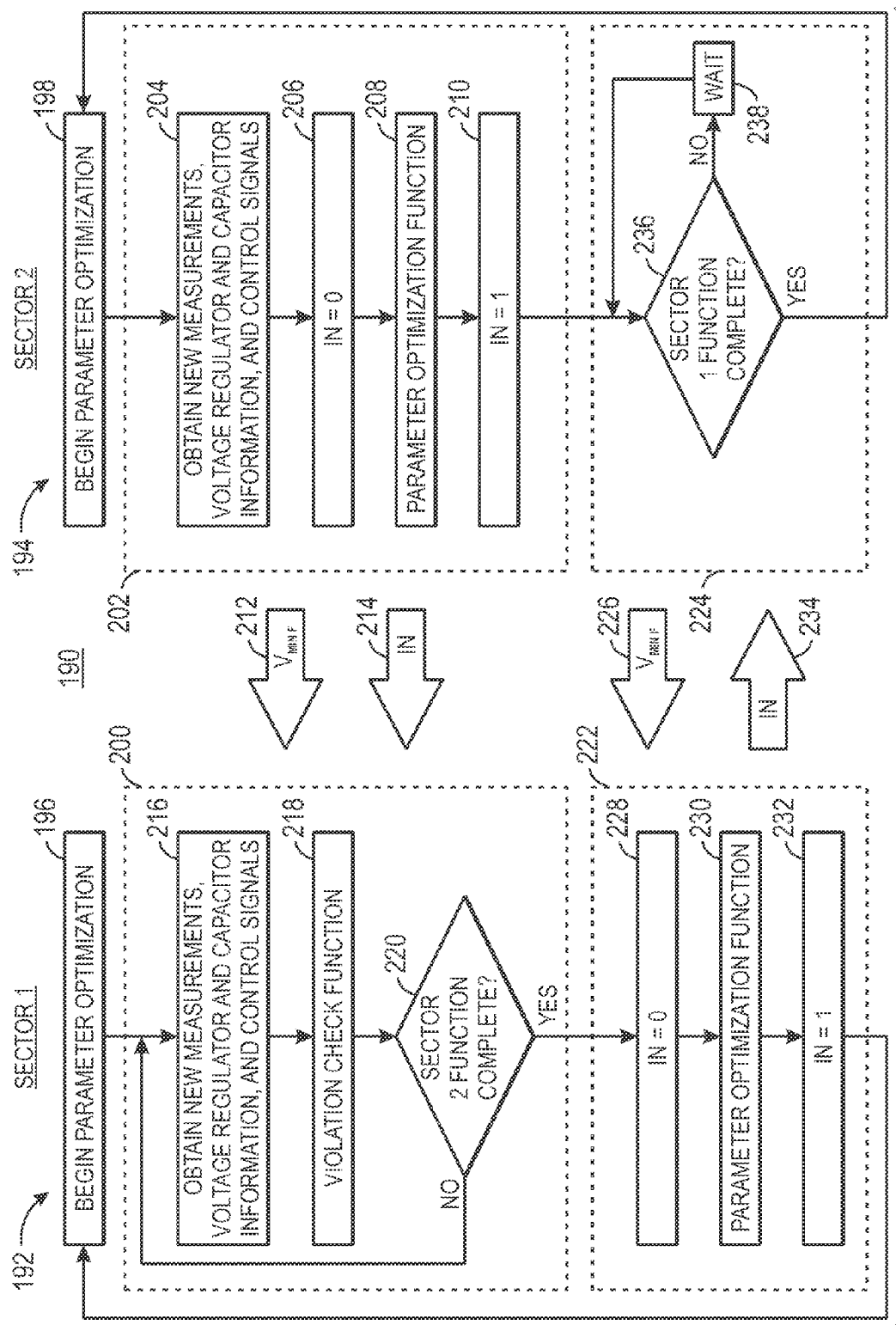
FIG. 20 is a flowchart describing an embodiment of a method for optimizing a desired operational parameter across a first segment of an electrical distribution system and a restored segment of the electrical distribution system via decentralized coordinated control.

The equivalent circuit of FIG. 19 may form a basis upon which to simulate operational parameters of the feeders 14A and/or 14B for purposes of optimizing a desired parameter. Indeed, a flowchart 190 of FIG. 20 illustrates one manner in which the desired parameter may be optimized on both the first feeder 14A and the restored segment 180 of the second feeder 14B. The flowchart 190 of FIG. 17 may include two processes 192 and 194 that are respectively carried out by different application platforms for Volt/Var optimization 18. That is, the process 192 may be carried out by the first application platform for Volt/Var optimization 18A that is associated with the first feeder 14A, and the process 194 may be carried out by the second application platform for Volt/Var optimization 18B that is associated with the second feeder 14B. The processes 192 and 194 may respectively begin with blocks 196 and 198 as the two application platforms for Volt/Var optimization 18 carry out active power loss reduction optimization.

The first application platform for Volt/Var optimization 18A associated with the first feeder 14A may carry out a process 200 while the second application platform for Volt/Var optimization 18B associated with the second feeder 14B carries out a process 202. Specifically, the second application platform for Volt/Var optimization 18B may obtain measurements 48 pertaining to the equipment of the feeder 14B, including the restored segment 180. The application platform for Volt/Var optimization 18B may also set an indicator IN (block 206) (e.g., IN=0) to indicate that the active power loss reduction optimization function is being carried out on the feeder 14B (block 208). The active power loss reduction optimization function of block 208 may be substantially the same as discussed above with reference to flowchart 130 of FIG. 16. After the application platform for Volt/Var optimization 18B has completed the active power loss reduction optimization function of block 208, the application platform for Volt/Var optimization 18B may set the indicator IN to indicate that the active power loss reduction optimization is complete (block 210), (e.g., IN=1). Meanwhile, the application platform for Volt/Var optimization 18B may occasionally publish data 212 and 214 to the application platform for Volt/Var optimization 18A, representing a minimum voltage $V_{min}$ across the second feeder 14B and the indicator IN.

While the second application platform for Volt/Var optimization 18B is carrying out the active power loss reduction optimization function in process 202, the first application platform for Volt/Var optimization 18A may obtain measurements associated with the first feeder 14A (block 216) and carry out a violation check function (block 218) to ensure that the desired parameter optimization carried out by the second application platform for Volt/Var optimization 18B does not cause any voltage violations on the first feeder 14A. The violation check function of block 218 may be substantially the same as the violation check function of block 150 of FIG. 16, which is discussed in greater detail below with reference to FIG. 26. If the indicator 214 indicates that the second application platform for Volt/Var optimization 18A has not completed the desired parameter optimization function (decision block 220), the first application platform for Volt/Var optimization 18A may continue to receive new measurements 48 and run the violation check function 218. Otherwise, when the second application platform 18B has completed the desired parameter optimization function on the second feeder 14B, the processes 192 and 194 both may progress to respectively carry out processes 222 and 224.

Namely, the second application platform for Volt/Var optimization 18B may continue to provide the minimum voltage of the second feeder 14B, shown as data 226 while the first application platform for Volt/Var optimization 18A carries out the process 222. That is, the first application platform for Volt/Var optimization 18A may set an indicator IN (e.g., IN=0) (block 228) before carrying out the desired parameter optimization function on the first feeder 14A (block 230). When the desired parameter optimization function of block 230 has completed, the first application platform for Volt/Var optimization 18A may change the indicator IN to note that the desired parameter optimization function of block 230 has completed (e.g., IN=1) (block 232).

Meanwhile, in the process 224, the second application platform for Volt/Var optimization 18B may receive the indicator IN as data 234 published by the first application platform for Volt/Var optimization 18A. As long as the data 234 suggests that the first application platform for Volt/Var optimization 18A has not completed the desired parameter optimization function (e.g., IN=0) (decision block 236), the second application platform for Volt/Var optimization 18B may continue to wait (block 238). When the data 234 indicates that the first application platform for Volt/Var optimization 18A has completed the desired parameter optimization function (e.g., IN=1) (decision block 236), both the feeder 14A and the restored segment of the feeder 14B may be understood to be optimized for the desired parameter. The flowchart 190 of FIG. 20 may repeat as desired.

Capacitor Control Function

Figure 21:
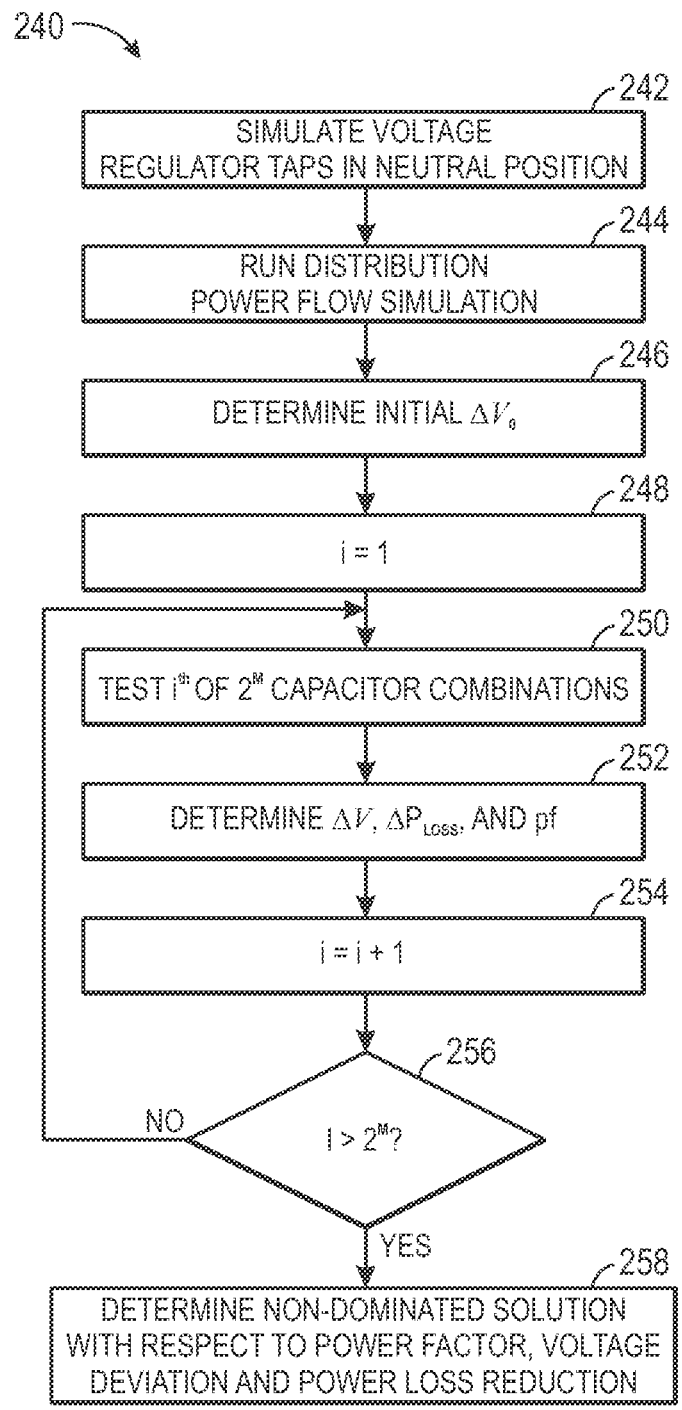
FIG. 21 is a flowchart describing an embodiment of a method for determining a combination of capacitors of an electrical distribution system that may be switched on or off to optimize a desired operational parameter.
Figure 22:
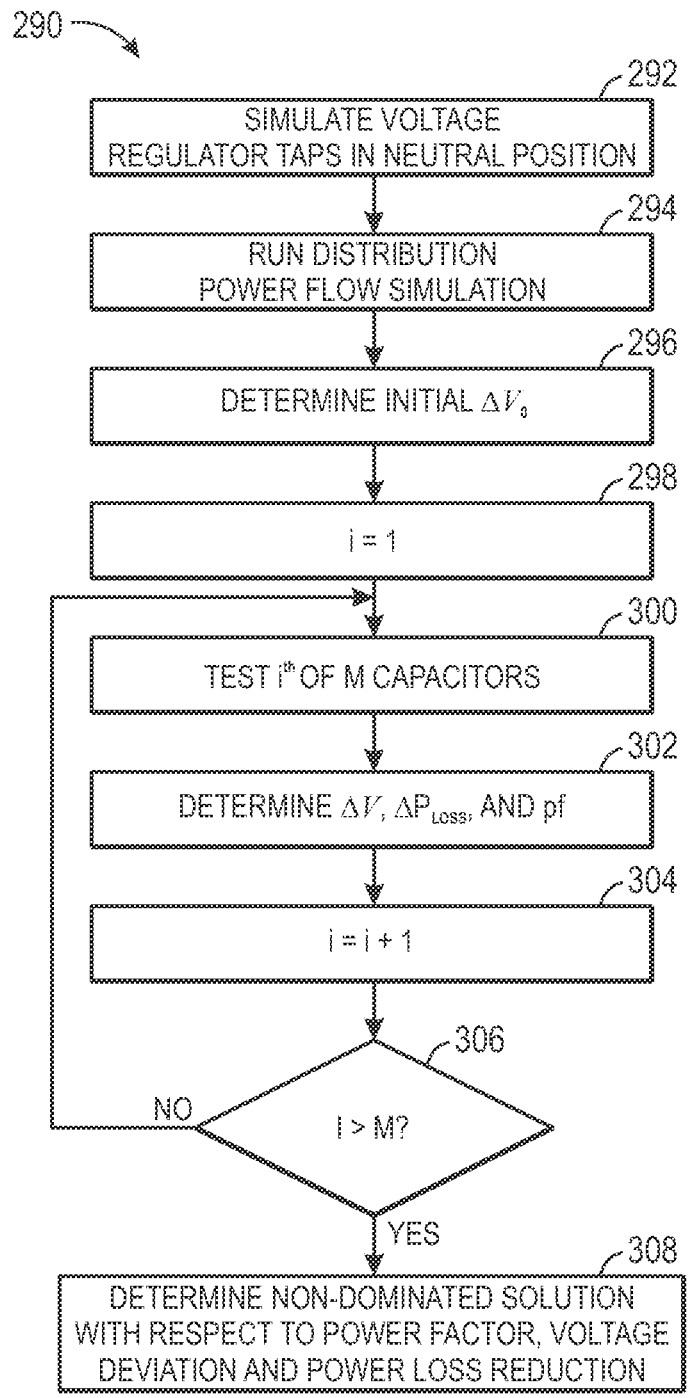
FIG. 22 is a flowchart describing an embodiment of a method for determining a capacitor that may be switched on or off to optimize a desired operational parameter.

FIGS. 21 and 22 represent examples of methods for carrying out the capacitor control function for active power loss reduction of block 136 of FIG. 16. As mentioned above, carrying out the method of FIG. 20 may produce a list of capacitors 22 of a feeder 14 that, when switched on or off, are expected to optimize active power losses on the feeder 14. In particular, FIG. 21 represents a flowchart 240 that may begin when the application platform for Volt/Var optimization 18 simulates the taps of the voltage regulators (VRs) 28 of the feeder 14 as being in a neutral position (block 242). Under such conditions, the application platform for Volt/Var optimization 18 may run a distribution power flow simulation in the manner discussed above with reference to FIG. 31 (block 244). Using such a distribution power flow simulation, the application platform for Volt/Var optimization 18 may determine an initial voltage deviation $\Delta V_0$, representing a baseline voltage deviation that may be used for comparison purposes later (block 246).

Next, the application platform for Volt/Var optimization 18 may iteratively test various capacitor-switching configurations, each of which may include a particular combination of capacitors 22 of the feeder 14 switched on and/or off. Thus, the application platform for Volt/Var optimization 18 may set a loop variable i=1 (block 248) and simulate the effect of each $i^{th}$ of $2^M$ capacitor-switching configurations of combinations of capacitors 22 (block 250), where M represents number of capacitors available for switching (note that the total number of capacitors on the circuit in N). In simulating the feeder 14 with each $i^{th}$ capacitor-switching configuration, the application platform for Volt/Var optimization 18 may determine the voltage deviation $\Delta V$ across the feeder 14, active power losses $P_{LOSS}$, and the power factor pf of the feeder 14 (block 252). The application platform for Volt/Var optimization 18 may increment i (block 254) and, while i is not greater than the total number of capacitor-switching configurations (i.e., $2^M$) (decision block 256), the application platform for Volt/Var optimization 18 may continue to simulate the effect of various capacitor-switching configurations on the feeder 14. After the voltage deviation $\Delta V$, active power losses $P_{LOSS}$ and power factors have been calculated for all of the capacitor-switching configurations, the application platform for Volt/Var optimization 18 may determine a non-dominated solution that optimizes the desired parameter (block 258).

A variation of the flowchart of FIG. 21 for determining a capacitor switching solution that optimizes the desired parameter appears as a flowchart 290 of FIG. 22. The flowchart 290 may take place in substantially the same manner as FIG. 21, with certain exceptions. In general, blocks 292-308 of FIG. 22 may take place in the same manner as blocks 242-258 of FIG. 21, except that blocks 300 and 306 of FIG. 22 are different from blocks 250 and 256 of FIG. 21. Specifically, in block 300 of the example of FIG. 22, the effect of a change in a single capacitor 22, rather than a combination of capacitors 22, may be determined Thus, as indicated by decision block 306 of FIG. 22, the number of tests may be reduced to M iterations rather than $2^M$ iterations, where M represents the number of capacitors 22 that can be switched in the feeder 14 (note that N is the total number of the capacitors installed on the feeder).

Figure 23:
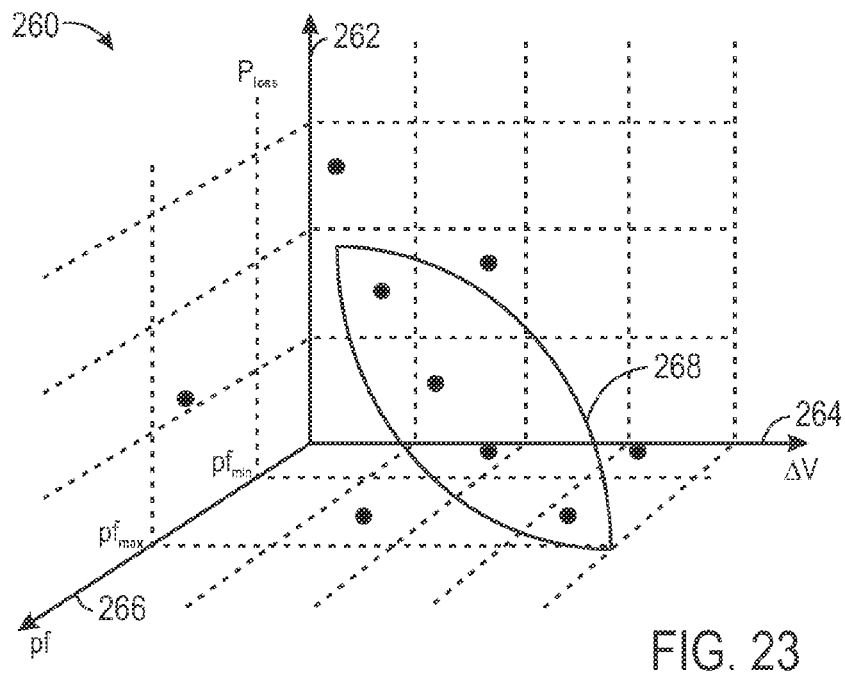
FIG. 23 is a plot representing a number of solutions that optimize various operating parameters in 3-D space.

A 3-D plot 260 shown in FIG. 23 represents various solutions for voltage deviation $\Delta V$, power loss $P_{LOSS}$, and power factor for various capacitor-switching configuration combinations, as generally may be determined in blocks 252 of the flowchart 240 of FIGS. 21 and 302 of the flowchart 290 of FIG. 22. In the 3-D plot 260, a first axis 262 represents power loss $P_{LOSS}$, a second axis 264 represents voltage deviation $\Delta V$, and a third axis 266 represents power factor. A 3-D solution space 268 represents a 3-D boundary, within which various solutions for capacitor-switching configurations may produce acceptable results. It should be appreciated that, from such a range of acceptable solutions as may be found within the 3-D solution space 268 a non-dominated solution may be determined that optimizes the desired parameter while other operational parameters of the feeder 14 remain as desirable as may be possible.

When the application platform for Volt/Var optimization 18 attempts to optimize both voltage deviation $\Delta V$ while also optimizing active power losses $P_{LOSS}$ to the greatest extent, which are in tension with one another, the application platform for Volt/Var optimization 18 may select a capacitor-switching configuration that offers the best voltage deviation $\Delta V$ in view of the active power loss $P_{LOSS}$. For example, as shown by a plot 284 of FIG. 24, in which an ordinate 286 represents active power losses $P_{LOSS}$, and an abscissa 288 represents a voltage deviation $\Delta V$, and optimal non-dominated solution optimizing both voltage deviation $\Delta V$ and active power loss $P_{LOSS}$ may occur when a distance 289 from the origin to the solution reaches a minimum, as illustrated. This consideration may be made when carrying out a Volt/VAR optimization.

As described above with reference to FIG. 16, the application platform for Volt/Var optimization 18 may carry out a first voltage regulator function at block 142, a violation check function at block 150, and a second voltage regulator function at block 154. These functions will now be described in greater detail below.

First Voltage Regulator Function

Figure 25:
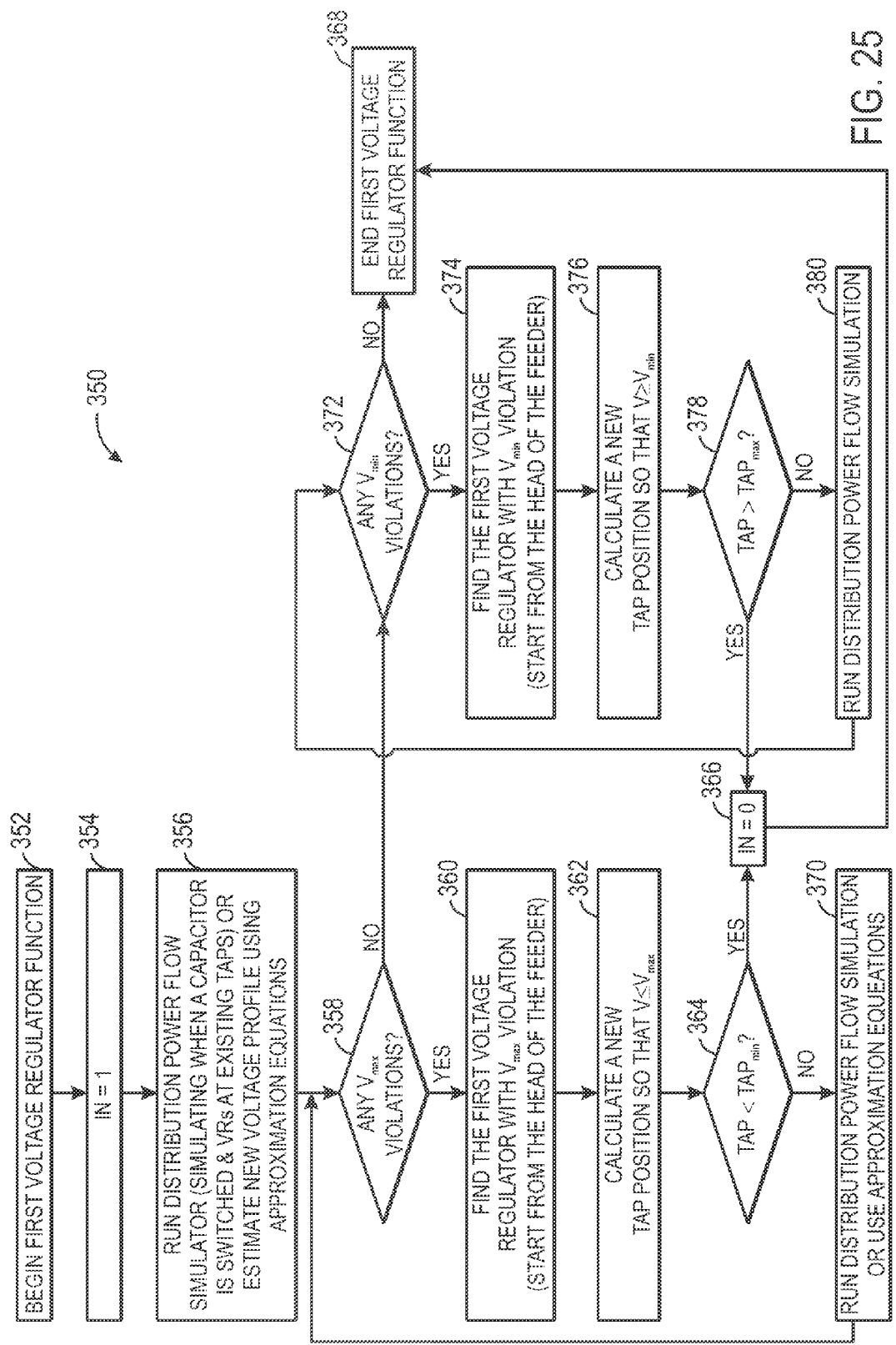
FIG. 25 is a flowchart describing an embodiment of a method for determining and responding when switching is expected to cause a voltage violation on the segment of the electrical distribution system.

One example of the first voltage regulator function that may be carried out at block 142 of FIG. 16 appears as a flowchart 350 in FIG. 25. To carry out the first voltage regulator function of block 142 of FIG. 16, the application platform for Volt/Var optimization 18 may begin the function (block 352), and set an indicator IN to a default value (e.g., IN=1) (block 354). The application platform for Volt/Var optimization 18 then may run a distribution power flow simulation of the feeder 14 that simulates when a particular capacitor 22 is switched on or off and simulating the voltage regulators (VRs) 28 at their current taps (block 356) or use approximate equations to estimate the new voltage profile. If a maximum voltage on the feeder 14 exceeds a desired value (e.g., $V_{max}$>126V) (decision block 358), the voltage regulators (VRs) 28 may be adjusted to cause the maximum voltage to be reduced, if possible. In particular, the application platform for Volt/Var optimization 18 may iteratively adjust the voltage regulators (VRs) 28, starting with the first voltage regulator (VR) 28 that has a maximum voltage violation, starting from the head of the feeder 14 (block 360). The application platform for Volt/Var optimization 18 may calculate a different tap position for the first voltage regulator (VR) 28 such that the new voltage of the first voltage regulator (VR) 28 is less than the maximum allowable voltage $V_{max}$ (block 362).

If the tap position calculated at block 362 is not feasible because it falls lower than the capabilities of the first voltage regulator (VR) 28 (decision block 364), the application platform for Volt/Var optimization 18 may indicate (block 366) that the selected capacitor 22 cannot be switched without a voltage violation (e.g., IN=0), and the first voltage regulator function may end (block 368). If instead the tap position calculated at block 362 is a feasible tap position for the voltage regulator (VR) 28 (decision block 364), the application platform for Volt/Var optimization 18 may run the distribution power flow simulation once more (block 370), continuing to search for voltage violations.

Returning to decision block 358, when no maximum voltage violation is determined to occur anywhere on the feeder 14 (decision block 358), the application platform for Volt/Var optimization 18 may ascertain whether any minimum voltage violations occur across the feeder 14 (decision block 372). If no minimum voltage violations are simulated to occur on the feeder 14 (e.g., $V_{min}$≥114V), the first voltage regulator function may end (block 368) while the indicator IN is set to indicate that the selected capacitor 22 can be switched on without a voltage violation (e.g., IN=1).

If a minimum voltage on the feeder 14 falls beneath a desired value (e.g., $V_{min}$<114V) (decision block 372), the voltage regulators (VRs) 28 may be adjusted to cause the minimum voltage to be increased, if possible. In particular, the application platform for Volt/Var optimization 18 may iteratively adjust the voltage regulators (VRs) 28, starting with the first voltage regulator (VR) 28 that has a minimum voltage violation, starting from the head of the feeder 14 (block 374). The application platform for Volt/Var optimization 18 may calculate a different tap position for the first voltage regulator (VR) 28 such that the new voltage of the first voltage regulator (VR) 28 is greater than the minimum allowable voltage $V_{min}$ (block 376).

If the tap position calculated at block 376 is not feasible because it is higher than the capabilities of the first voltage regulator (VR) 28 (decision block 378), the application platform for Volt/Var optimization 18 may indicate (block 366) that the selected capacitor 22 cannot be switched without a voltage violation (e.g., IN=0), and the first voltage regulator function may end (block 368). If instead the tap position calculated at block 362 is a feasible tap position for the voltage regulator (VR) 28 (decision block 378), the application platform for Volt/Var optimization 18 may run the distribution power flow simulation once more (block 380) or use approximation method for determining the voltage profile, continuing to search for voltage violations.

Violation Check Function

Figure 26:
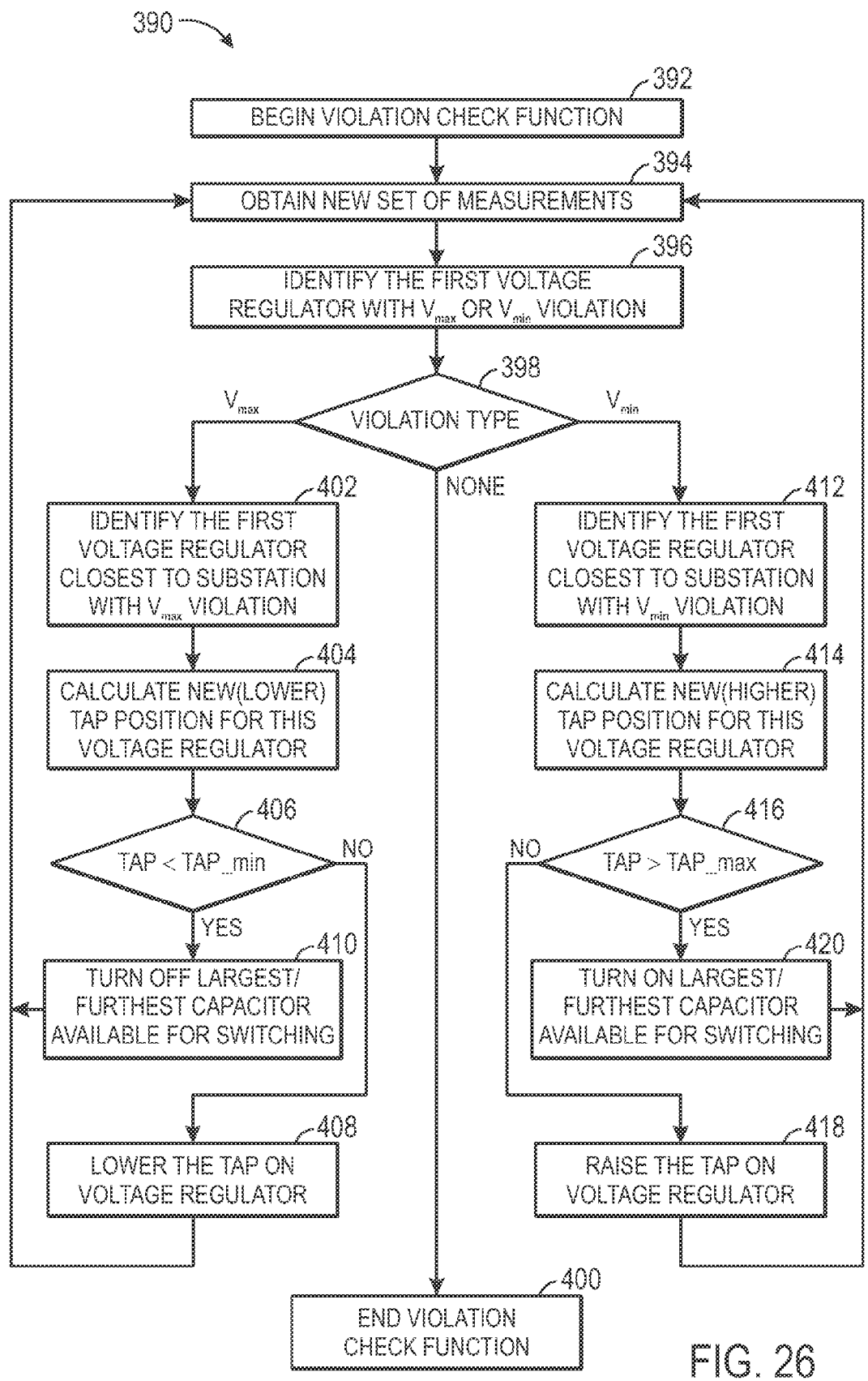
FIG. 26 is a flowchart describing an embodiment of a method for detecting and/or correcting any voltage violation that occurs when a capacitor is switched on or off.

A flowchart 390 of FIG. 26 represents an example of the violation check function of block 150 in FIG. 16, which represents a component of the active power loss reduction optimization function. Recalling that the violation check function of FIG. 26 may take place after a capacitor 22 has been switched at block 148 of FIG. 16, the violation check function of flowchart 390 may verify that no voltage violations have occurred after the capacitor 22 has been switched or, if a voltage violation has occurred occur, the violation check function of flowchart 390 may take corrective action to mitigate the violations. The flowchart 390 may begin when the application platform for Volt/Var optimization 18 starts to carry out the violation check function (block 392) and obtains a new set of measurements 48 of the feeder 14 (block 394). The new set of measurements 48 obtained by the application platform for Volt/Var optimization 18 at block 394 may be used by the application platform for Volt/Var optimization 18 to search for any voltage regulators (VRs) 28 that exhibit a maximum voltage or minimum voltage violation (block 396). If no voltage violation is found (decision block 398), the application platform for Volt/Var optimization 18 may end the violation check function (block 400).

Figure 24:
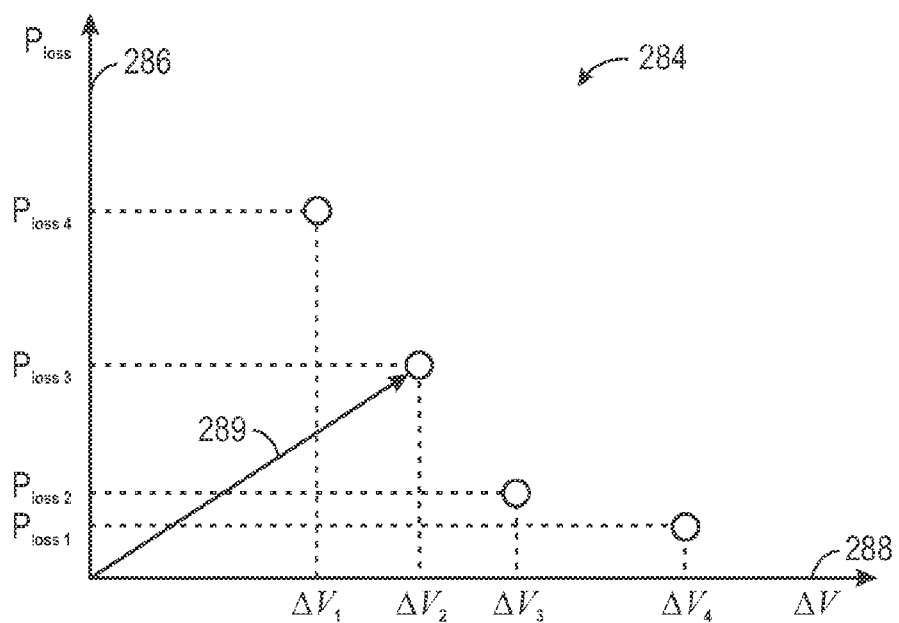
FIG. 24 is a plot representing a non-dominated solution from among the solutions of FIG. 22, which represents a compromise between loss reduction and voltage difference, in accordance with an embodiment.

In the event that switching the capacitor 22 at block 148 of FIG. 16, the flowchart 390 of FIG. 24 that represents an example of the block 150 of FIG. 16 may cause the application platform for Volt/Var optimization 18 to undertake corrective measures. If a maximum voltage violation has occurred (decision block 398), the application platform for Volt/Var optimization 18 first may identify the voltage regulator (VR) 28 nearest to the substation 12 exhibiting a maximum voltage violation (block 402). The application platform for Volt/Var optimization 18 may calculate a new, lower tap position associated with the voltage regulator (VR) 28 (block 404). If the calculated tap position is feasible (i.e., the calculated tap position is not lower than the minimum tap position available at the voltage regulator (VR) 28) (decision block 406), the application platform for Volt/Var optimization 18 may output a control signal 50 to cause the voltage regulator (VR) 28 to lower its tap to that calculated at block 404 (block 408). The application platform for Volt/Var optimization 18 then may continue to verify that no other voltage violations exist on the feeder 14, beginning again by obtaining a new set of measurements 48 (block 394). On the other hand, if the calculated tap position is not feasible (i.e., the calculated tap position is lower than a minimum available tap position of the voltage regulator (VR) 28) (decision block 406), the application platform for Volt/Var optimization 18 may output a controller signal 50 to turn off the largest capacitor 22 of the feeder 14 and/or furthest capacitor 22 from the substation 12 (block 410).

If a minimum voltage violation has occurred (decision block 398), the application platform for Volt/Var optimization 18 first may identify the voltage regulator (VR) 28 nearest to the substation 12 exhibiting a minimum voltage violation (block 412). The application platform for Volt/Var optimization 18 may calculate a new, higher tap position associated with the voltage regulator (VR) 28 (block 414). If the calculated tap position is feasible (i.e., the calculated tap position is not higher than the maximum tap position available at the voltage regulator (VR) 28) (decision block 416), the application platform for Volt/Var optimization 18 may output a control signal 50 to cause the voltage regulator (VR) 28 to raise its tap to that calculated at block 414 (block 418). The application platform for Volt/Var optimization 18 then may continue to verify that no other voltage violations exist on the feeder 14, beginning again by obtaining a new set of measurements 48 (block 394). On the other hand, if the calculated tap position is not feasible (i.e., the calculated tap position is higher than a maximum available tap position of the voltage regulator (VR) 28) (decision block 416), the application platform for Volt/Var optimization 18 may output a controller signal 50 to turn on the largest capacitor 22 of the feeder 14 and/or furthest capacitor 22 from the substation 12 (block 420).

Second Voltage Regulator Function

Figure 27:
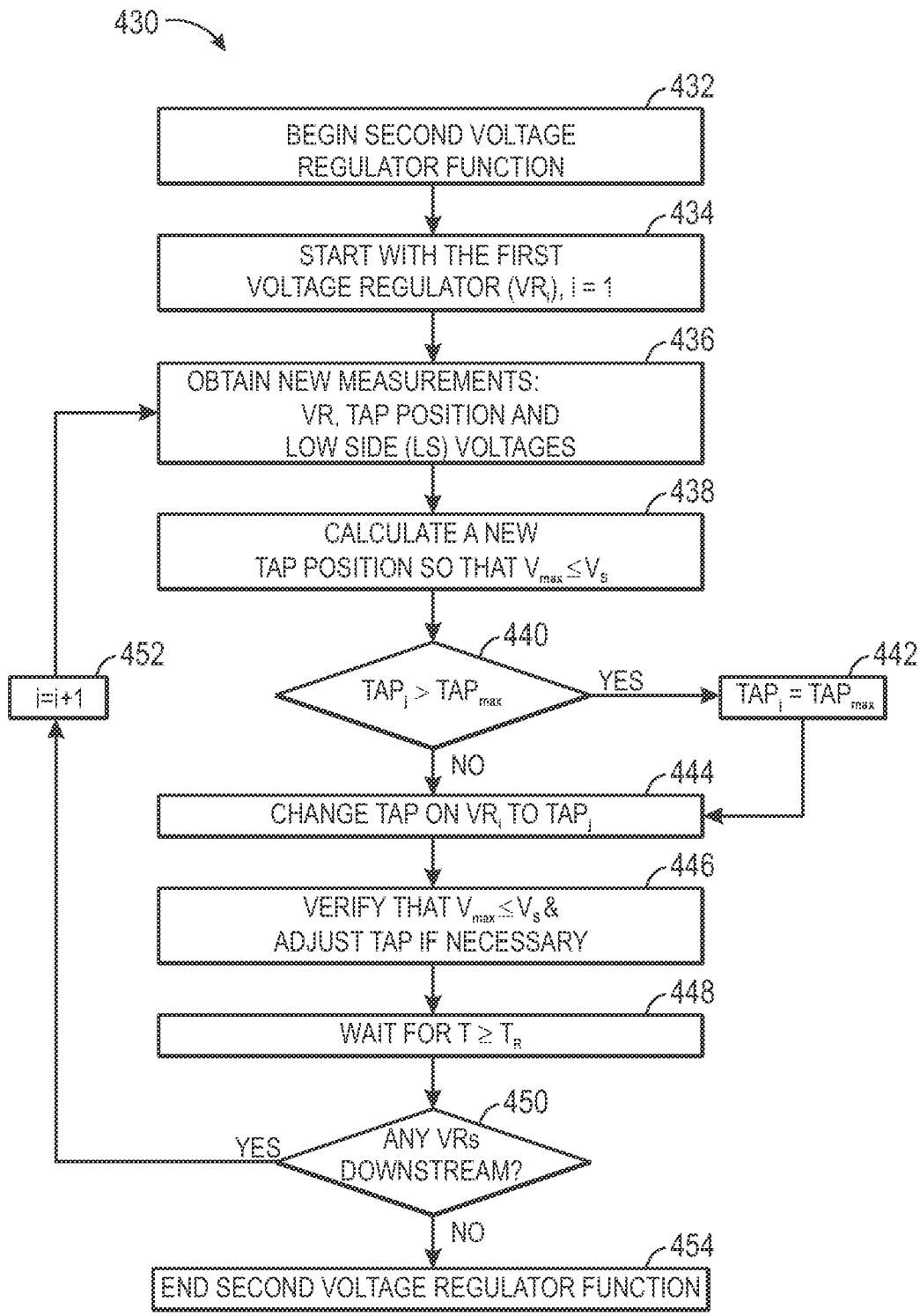
FIG. 27 is a flowchart describing an embodiment of a method for adjusting voltage regulators across a segment of an electrical distribution system after a desired operational parameter has been optimized.

A flowchart 430 of FIG. 27 represents an example of the second voltage regulator function carried out by the application platform for Volt/Var optimization 18 at block 154 of FIG. 16. As discussed above, this second voltage regulator function may cause the voltage regulators (VRs) 28 across the feeder 14 to maintain, to a great extent, a low-side (LS) bus output that is equal to the source voltage $V_S$. The flowchart 430 of FIG. 27, which represents an example of this second voltage regulator function, may begin when the application platform for Volt/Var optimization 18 starts the second voltage regulator function (block 432) and considers each voltage regulator (VR) 28 of the feeder 14 iteratively (block 434). In particular, the application platform for Volt/Var optimization 18 may begin with a first voltage regulator (VR) 28 (e.g., $VR_i$), where initially i=1.

The application platform for Volt/Var optimization 18 next may obtain new measurements 48 associated with the voltage regulator (VR) 28 being considered ($VR_i$) (block 436). In particular, the application platform for Volt/Var optimization 18 may receive measurements 48 indicating the current tap position of the voltage regulator (VR) 28 being considered ($VR_i$) as well as low-side (LS) and low-side (LS) bus voltages of the voltage regulator (VR) 28 being considered ($VR_i$).

The application platform for Volt/Var optimization 18 may calculate a new tap position for the voltage regulator (VR) 28, such that the maximum voltage of the voltage regulator (VR) 28 being considered ($VR_i$) approaches the source voltage (block 438). If the calculated tap position exceeds a maximum tap position capability of the voltage regulator (VR) 28 being considered ($VR_i$) (decision block 440), the application platform for Volt/Var optimization 18 may set the tap position to the maximum tap position (block 442). Otherwise, the application platform for Volt/Var optimization 18 may change the tap position of the voltage regulator (VR) 28 being considered ($VR_i$) to the tap position calculated at block 438 (block 444).

Having caused the voltage regulator (VR) 28 being examined ($VR_i$) to switch tap positions (if necessary), the application platform for Volt/Var optimization 18 may receive new measurements 48 to verify that the maximum voltage has not exceeded the source voltage, adjusting the tap position of the voltage regulator (VR) 28 being examined ($VR_i$) as needed (block 446). After waiting some time delay period $T_R$ (block 448), the application platform for Volt/Var optimization 18 may determine whether any further voltage regulators (VRs) 28 are present downstream of the most recently examined voltage regulator (VR) 28 ($VR_i$) (decision block 450). If so, the application platform for Volt/Var optimization 18 may increment the value i (block 452) and calculate once more a new tap position for the downstream voltage regulator (VR) 28 ($VR_i$) now being examined in the manner described above. Otherwise (decision block 450), the application platform for Volt/Var optimization 18 may end the second voltage regulator function (block 454). When the second voltage regulator function ends at block 454, the maximum voltage of the voltage regulators (VRs) 28 of the feeder 14 should be close to the source voltage $V_S$ without exceeding it.

Voltage Reduction Function

Figure 28:
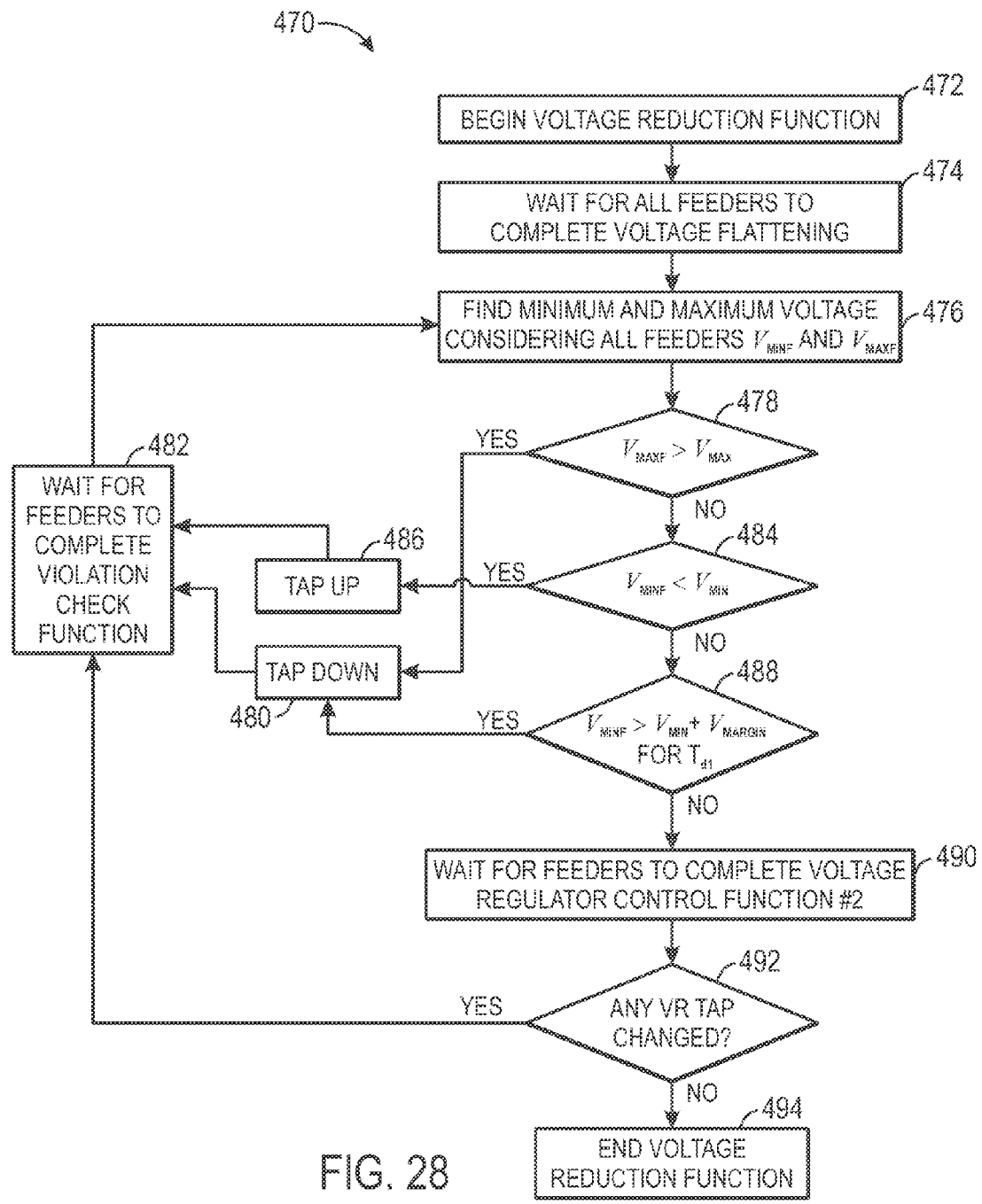
FIG. 28 is a flowchart describing an embodiment of a method for reducing the voltage supplied by a substation to various segments of an electrical distribution system after the voltage has been flattened across the segments.

As noted above, when the optimization function of FIG. 16 is run to optimize the voltage of the feeder 14, the voltage across the feeder 14 may be reduced after it has been flattened via the voltage reduction function of block 156 of FIG. 16. A flowchart 470 of FIG. 28 represents one example of this voltage reduction function undertaken at block 156 of FIG. 16. The flowchart 470 of FIG. 28 may begin as the application platform for Volt/VAR optimization 18 starts the voltage reduction function (block 472), waiting until the application platform for Volt/VAR optimization 18 has performed the voltage flattening function as to all feeders associated with the substation 12 (block 474). Once the voltage flattening function applied across the feeders 14 have completed, the application platform for Volt/VAR optimization 18 may determine the maximum and minimum voltages of all the feeders using measurements 48 (block 476). If any of the maximum voltages of the feeders 14 exceeds a maximum acceptable voltage (decision block 478), the application platform for Volt/VAR optimization 18 may cause the LTC 16 to tap down (block 480), and may wait for the violation check function for all of the feeders 14 to complete (block 482). Otherwise, the application platform for Volt/VAR optimization 18 may determine whether the minimum voltage of any of the feeders 14 falls beneath a minimum acceptable voltage $V_{min}$ (decision block 484). If so, the application platform for Volt/VAR optimization 18 may cause the LTC 16 to tap up (block 486), before waiting for the violation check function for all of the feeders 14 to complete (block 482). Note that any successive tap changes should not exceed a predefined number of taps (e.g., 8 taps which is equivalent to 5% voltage change).

If the lowest measured voltages on all of the feeders 14 are such that the minimum is greater than the minimum plus a voltage margin, for a period longer than some configurable time delay TD1 (decision block 488), the application platform for Volt/VAR optimization 18 may cause the LTC transformer 16 to tap down (block 480), continuing to do so until the minimum voltage present on the feeders 14 approaches the minimum acceptable voltage $V_{min}$. Note that any successive tap changes should not exceed a predefined number of taps (e.g., 8 taps which is equivalent to 5% voltage change).

The application platform for Volt/VAR optimization 18 may thereafter wait for the second voltage regulator function to be completed for all feeders 14 (block 490). If the second voltage regulator function results in any voltage regulator (VR) 28 tap changes occurring (decision block 492), the application platform for Volt/VAR optimization 18 may wait for the violation check function for all of the feeders 14 to complete (block 482) before returning to block 476 of the flowchart 470. Otherwise, the voltage reduction function may end (block 494).

Figure 29:
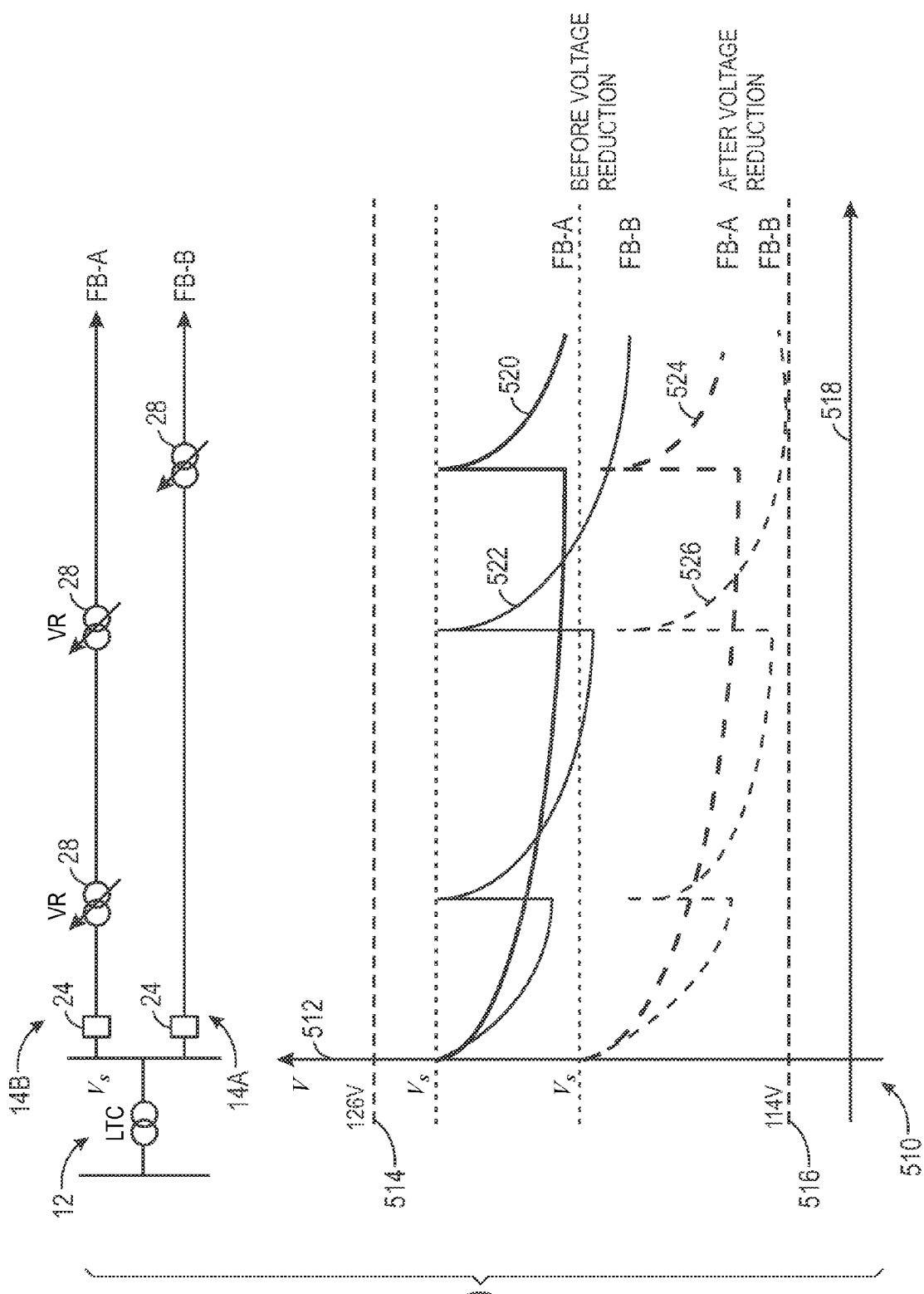
FIG. 29 is a plot illustrating the reduction of the voltage across the segments of the electrical distribution system, in accordance with an embodiment.

As shown by a plot 510 of FIG. 29, the voltage reduction function of FIG. 28 may effectively reduce the source voltage $V_S$ to the greatest extent possible. The plot 510 of FIG. 29 includes an ordinate 512 representing voltage along the feeders 14A and 14B, shown above the plot 510. These voltages extend between a maximum acceptable voltage $V_{max}$ at numeral 514, represented as 126 volts, and a minimum voltage $V_{min}$ represented at numeral 516 as 114 volts. An abscissa 518 represents the length of the feeders 14. As shown in the plot 510, curves 520 and 522 represent the voltage level across the first feeder 14A and second feeder 14B, respectively, before the voltage reduction function of FIG. 28 is carried out. Curves 524 and 526, on the other hand, represent the voltage levels across the length of the feeders 14A and 14B, respectively, after performing the voltage reduction function of FIG. 28. As can be seen, the curve 524 is lower than the corresponding curve 520, and the curve 526 is lower than the corresponding curve 522. At all times, however, the curves 524 and 526 remain above the minimum acceptable voltage at numeral 516.

Substation Power Factor Optimization

Figure 30:
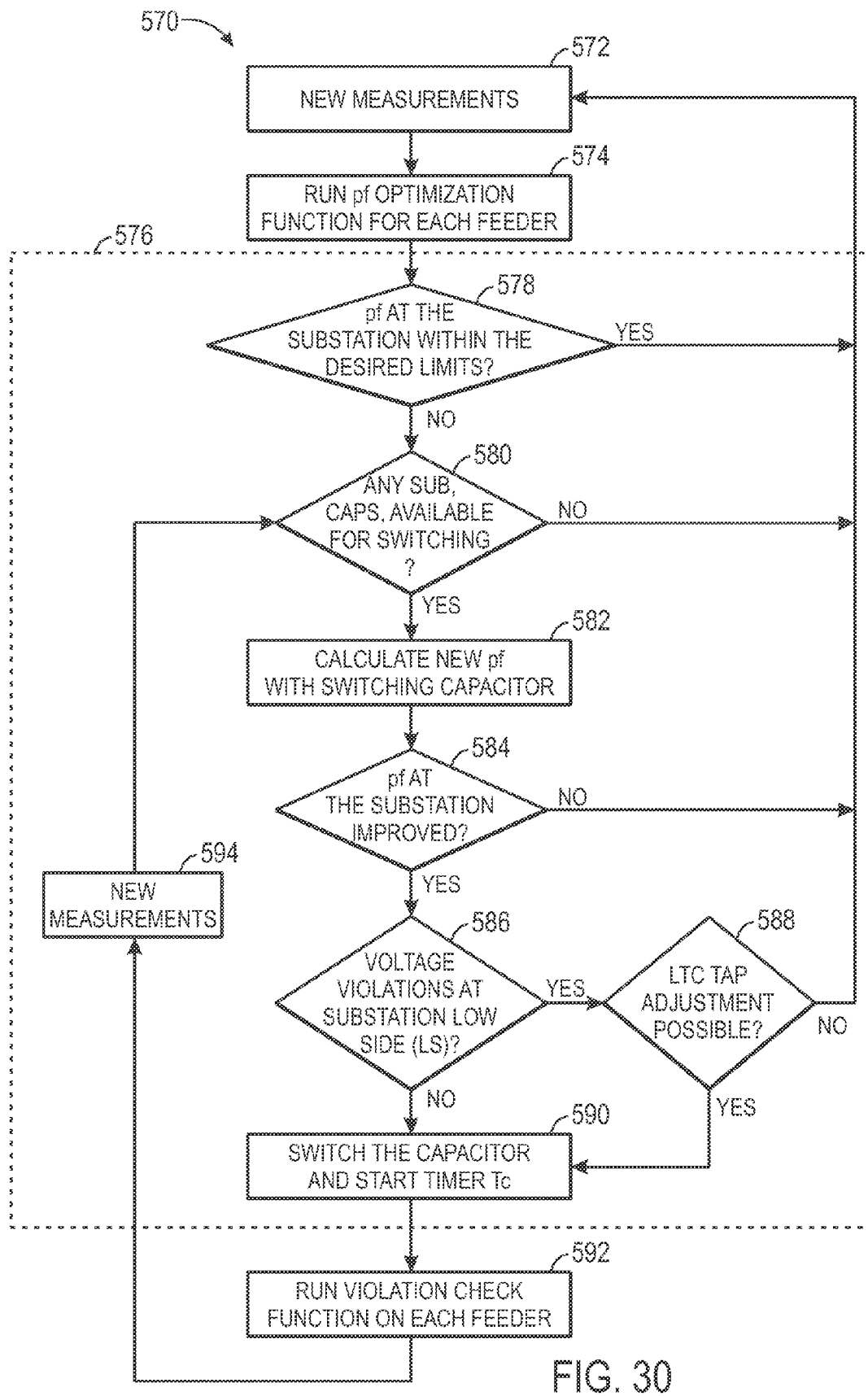
FIG. 30 is a flowchart describing an embodiment of a method for optimizing power factor at a substation after the feeder segments of the electrical distribution system have been optimized for power factor.

To optimize power factor at both the substation level 12 and the feeder levels 14, the application platform for Volt/Var optimization 18 may adjust substation 12 capacitor banks 22 after optimizing the power factor on the feeders 14. A flowchart 570 of FIG. 30 represents one such example of a method for improving power factor at the substation level 12. The flowchart 570 of FIG. 30 may begin when the application platform for Volt/Var optimization 18 obtains new measurements 48 (block 572). The application platform for Volt/Var optimization 18 may perform the power factor optimization function for each feeder 14, resulting in power factor on the feeder to be in the desired range without causing a voltage violation (block 574).

Having optimized the power factor at each of the feeders 14 at block 574, the application platform for Volt/Var optimization 18 may undertake the actions described in blocks 576 to optimize the power factor at the substation 12 level. Specifically, the application platform for Volt/Var optimization 18 may determine whether the power factor at the substation 12 is within the desired limits (e.g., the power factor at the substation 12 is within a threshold difference from the desired power factor $pf_{des}$ (decision block 578). If so, no other action is needed and we return to block 572. If not, the application platform for Volt/Var optimization 18 may ascertain whether any substation 12 capacitors 22 are available for switching (decision block 580).

When no capacitors 22 are available at the substation 12 (decision block 580), the application platform for Volt/Var optimization 18 may return to block 572. If there are any substation 12 capacitors 22 that are available (decision block 580), the application platform for Volt/Var optimization 18 may calculate possible power factor changes that would occur if the capacitor 22 at the substation 12 were switched (block 582). If switching the capacitor 22 would not improve the power factor at the substation 12, the application platform for Volt/Var optimization 18 may return to block 572.

If the power factor at the substation 12 would be improved (decision block 584), the application platform for Volt/Var optimization 18 may ascertain whether any voltage violations would occur at the substation 12 low-side (LS) bus (decision block 586). If so, and no LTC transformer 16 tap adjustments are possible (decision block 588), the application platform for Volt/Var optimization 18 may opt not to switch the capacitor 22 at the substation 12, but rather return to block 572. On the other hand, if no voltage violations are expected to occur where the capacitor 22 switched on (decision block 586), or if LTC transformer 16 tap adjustments are possible (decision block 588), the application platform for Volt/Var optimization 18 may issue control signals 50 to cause the capacitor 22 to be switched (block 590). Additionally, the application platform for Volt/Var optimization 18 may start a timer $T_C$, delineating when the capacitor 22 again may be switched at a later time.

To ensure no new voltage violations have occurred, the application platform for Volt/Var optimization 18 may run the violation check function (e.g., as discussed above for each of the feeders 14 (block 592). The application platform for Volt/Var optimization 18 also may obtain new measurements 48 (block 594) and return to block 578.

Technical effects of the present disclosure include, among other things, improved voltage flattening and reduction, improved reduction in active power losses, and/or improved power factor on a segment of an electrical distribution system. These improvements may occur at opportune times most appropriate given the power generation constraints currently impacting the electrical distribution system. Thus, according to embodiments of the present disclosure, loads of an electrical distribution system may consume less power from the segment of the electrical distribution system when demand or generation costs are high. In some examples, the electrical distribution system may then reduce power losses when demand or generation costs are not excessively high. In addition, the control of a restored segment of an electrical distribution system can also be undertaken using the same control functions used to control a normally configured segment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A controller comprising:
   a network interface configured to receive first measurements associated with a segment of an electrical distribution system and transmit a control signal configured to control equipment of the segment of the electrical distribution system; and
   data processing circuitry configured:
   to determine a total load on the segment of the electrical distribution system;
   to run a first simulation of the segment of the electrical distribution system simulating various equipment configurations based at least in part on the first measurements;
   to select from among the various equipment configurations, depending at least in part on the total load:
   a first equipment configuration that is expected to cause a voltage deviation of the segment of the electrical distribution system to most closely approach a first desired value without causing voltage violations or power factor to fall beneath a power factor threshold;
   a second equipment configuration that is expected to cause the voltage deviation of the segment of the electrical distribution system to more closely approach the first desired value than otherwise and active power losses of the segment of the electrical distribution system to more closely approach a second desired value than otherwise without causing voltage violations or power factor to fall beneath the power factor threshold; or
   a third equipment configuration that is expected to cause the active power losses of the segment of the electrical distribution system to most closely approach the second desired value without causing voltage violations or power factor to fall beneath the power factor threshold; and
   to generate the control signal, wherein the control signal is configured to cause the equipment of the segment of the electrical distribution system to conform to the equipment configuration.

2. The controller of claim 1, wherein the data processing circuitry is configured to select the first equipment configuration when the total load is within a first range, the second equipment configuration when the total load is within a second range, and the third equipment configuration when the total load is within a third range, wherein the first range is higher than the second range and the third range and wherein the second range is higher than the third range.

3. The controller of claim 1, wherein the data processing circuitry is configured to determine a power factor on the segment of the electrical system and select a fourth equipment configuration that is expected to cause the power factor to most closely approach a desired power factor value when the power factor is less than a power factor threshold.

4. The controller of claim 1, wherein the control signal is configured to control the equipment of the segment of the electrical distribution system, wherein the equipment comprises at least one capacitor, and wherein the data processing circuitry is configured to run the simulation of the segment of the electrical distribution system simulating various equipment configurations, wherein the various equipment configurations comprise various capacitor switching configurations.

5. The controller of claim 4, wherein the capacitor switching configuration indicates that a single one of a plurality of capacitors of the segment of the electrical distribution system is to be switched on or off.

6. The controller of claim 4, wherein the capacitor switching configuration indicates that a combination of a plurality of capacitors of the segment of the electrical distribution system are to be switched on or off.

7. The controller of claim 6, wherein the data processing circuitry is configured to determine a switching order of the combination of the plurality of capacitors.

8. The controller of claim 1, wherein the network interface is configured to obtain the first measurements from a plurality of remote terminal units, wherein the first measurements comprise:
   a voltage magnitude at a low side bus of a substation of the segment of the electrical distribution system;
   a voltage magnitude at capacitors of the segment of the electrical distribution system;
   a voltage magnitude at low sides of voltage regulators of the segment of the electrical distribution system;
   tap positions of the voltage regulators;
   real and reactive power flows at capacitors and at all junction points between the capacitors and the voltage regulators and the substation;
   real and reactive power flows at a high side bus of the substation or real and reactive power flows from each feeder of the segment of the electrical distribution system, or both;
   real and reactive demand from each commercial or industrial, or commercial and industrial, load between the substation and any of the capacitors; and
   end of line voltages of the segment of the electrical distribution system or a voltage drop between a last measurement point and an end of a feeder.

9. The controller of claim 1, wherein the data processing circuitry is configured to run a second simulation of the segment of the electrical distribution system based at least in part on the selected equipment configuration before generating the control signal to determine whether the selected equipment configuration is expected to cause a voltage violation on the segment of the electrical distribution system and, when the selected equipment configuration is expected to cause the voltage violation, to determine a tap position for a voltage regulator of the segment of the electrical distribution system that is expected to prevent the voltage violation from occurring.

10. The controller of claim 1, wherein the network interface is configured to receive second measurements associated with the segment of the electrical distribution system a period of time after transmitting the control signal, wherein the second measurements reflect an actual effect of the equipment configuration on the segment of the electrical distribution system, and wherein the data processing circuitry is configured to determine whether the second measurements indicate a voltage violation and, when the second measurements indicate the voltage violation, to vary the equipment configuration to prevent the voltage violation.

11. The controller of claim 10, wherein the data processing circuitry is configured, when the second measurements indicate the voltage violation, to identify a voltage regulator of the segment of the electrical distribution system that is situated closest to a substation of the electrical distribution system, to calculate a lower or higher tap position associated with the voltage regulator that is expected to prevent the voltage violation and, when the tap position is not higher than a maximum tap position or lower than a minimum tap position, to cause the to cause the voltage regulator to assume the tap position and, when the tap position is higher than the maximum tap position or lower than the minimum tap position, to cause a switchable capacitor of the segment of the electrical distribution system that is located furthest from the substation of the electrical distribution system or that is the largest capacitor of the segment of the electrical distribution system to be switched on or off.

12. The controller of claim 1, wherein the data processing circuitry is configured, after transmitting the control signal, to cause one or more voltage regulators of the segment of the electrical distribution system to cause a high side voltage of the one or more voltage regulators to be approximately equal to a low side voltage of a substation that supplies voltage to the segment of the electrical distribution system.

13. A method comprising:
   determining, using a first substation application platform associated with a first segment of an electrical distribution system or a second substation application platform associated with a second segment of the electrical distribution system, an estimated cost of generating power at a current or future time period on the first segment of an electrical distribution system or the second segment of the electrical distribution system, or both; and
   determining to run, using the first substation application platform or the second substation application platform:
      a voltage control function to cause a voltage deviation of the first segment or the second segment, or both, to most closely approach a first desired value without causing voltage violations or power factor to fall beneath a power factor threshold;
      a Volt/VAR control function to cause the voltage deviation of the first segment or the second segment, or both, to more closely approach the first desired value than otherwise and active power losses of the first segment or the second segment, or both, to more closely approach a second desired value than otherwise without causing voltage violations or power factor to fall beneath the power factor threshold;
      a power loss reduction function to cause the active power losses of the first segment or the second segment, or both, to most closely approach the second desired value without causing voltage violations or power factor to fall beneath the power factor threshold; or
      a power factor control function to cause the power factor to most closely approach a desired power factor value; or
      a combination thereof;
   based at least in part on the estimated cost of generating power during the current or future time period.

14. The method of claim 13, wherein the power loss reduction function is determined to be run when the estimated cost of generating power is less than a first threshold and a second threshold, the Volt/VAR control function is determined to be run when the estimated cost of generating power is equal to or greater than the first threshold and less than the second threshold, and the voltage control function is determined to be run when the estimated cost of generating power is equal to or greater than the second threshold.

15. The method of claim 13, comprising controlling the first segment and the second segment while the first segment is providing power to a recovered portion of the second segment by:
running the voltage control function, the Volt/VAR control function, the power loss reduction function, or the power factor control function, or the combination thereof, on the second segment using the second substation application platform;
while the second application platform is running the voltage control function, the Volt/VAR control function, the power loss reduction function, or the power factor control function, or the combination thereof, on the second segment, running a violation check function on the first segment using the first substation application platform, wherein the violation check function is configured to prevent or mitigate a voltage violation on the first segment; and
after running the voltage control function, the Volt/VAR control function, the power loss reduction function, or the power factor control function, or the combination thereof, on the second segment using the second substation application platform, running the voltage control function, the Volt/VAR control function, the power loss reduction function, or the power factor control function, or the combination thereof, on the first segment using the first substation application platform.

16. The method of claim 15, comprising communicating a minimum voltage of the second segment from the second substation application platform to the first substation application platform while the first substation application platform is running the violation check function on the first segment or while the first substation application platform is running the voltage control function, the Volt/VAR control function, the power loss reduction function, or the power factor control function, or the combination thereof, on the first segment, or both.

17. The method of claim 15, comprising communicating from the second substation application platform to the first application platform an indication that the second substation application platform has finished running the voltage control function, the Volt/VAR control function, the power loss reduction function, or the power factor control function, or the combination thereof, when the second substation application platform for has finished running the voltage control function, the Volt/VAR control function, the power loss reduction function, or the power factor control function, or the combination thereof, and communicating from the first substation application platform for to the second substation application platform an indication that the first substation application platform has finished running the voltage control function, the Volt/VAR control function, the power loss reduction function, or the power factor control function, or the combination thereof, when the first substation application platform has finished running the voltage control function, the Volt/VAR control function, the power loss reduction function, or the power factor control function, or the combination thereof.

18. The method of claim 15, comprising, while the first substation application platform is running the voltage control function, the Volt/VAR control function, the power loss reduction function, or the power factor control function, or the combination thereof, on the first segment, running a violation check function on the second segment using the second substation application platform, wherein the violation check function is configured to prevent or mitigate a voltage violation on the second segment.

19. An article of manufacture comprising:
one or more tangible, machine-readable storage media having instructions encoded thereon for execution by a processor of an electronic device, the instructions comprising:
instructions to receive measurements associated with a feeder of an electrical distribution system;
instructions to determine an expected load on the feeder at a present or future time period;
instructions to simulate a distribution power flow of the feeder according to various capacitor switching configurations of at least one capacitor of the feeder using the measurements;
instructions to determine an expected voltage deviation, reduction in power loss, and power factor associated with the various capacitor switching configurations based at least in part on the simulated distribution power flow of the feeder;
instructions to select a non-dominated capacitor switching configuration from among the various capacitor switching configurations:
a first capacitor switching configuration that is expected to cause a voltage deviation of the segment of the electrical distribution system to most closely approach a first desired value without causing voltage violations or power factor to fall beneath a power factor threshold;
a second capacitor switching configuration that is expected to cause the voltage deviation of the segment of the electrical distribution system to more closely approach the first desired value than otherwise and active power losses of the segment of the electrical distribution system to more closely approach a second desired value than otherwise without causing voltage violations or power factor to fall beneath the power factor threshold; or
a third capacitor switching configuration that is expected to cause the active power losses of the segment of the electrical distribution system to most closely approach the second desired value without causing voltage violations or power factor to fall beneath the power factor threshold;
wherein the first, second, or third capacitor switching configuration is selected based at least in part on the expected load on the feeder at the present or future time period; and
instructions to control capacitors of the feeder according to the non-dominated capacitor switching configuration during the present or future time period.

20. The article of manufacture of claim 19, comprising instructions to transmit at least one of the measurements to another electronic device associated with another feeder of the electrical distribution system.

* * * * *